United States Patent
Kim et al.

(10) Patent No.: US 9,395,831 B2
(45) Date of Patent: Jul. 19, 2016

(54) DISPLAY DEVICE

(71) Applicant: Samsung Display Co., Ltd., Yongin (KR)

(72) Inventors: InCheol Kim, Goyang-si (KR); JiHong Park, Suwon-si (KR); Kangwon Lee, Seoul (KR); SeungHo Nam, Seongnam-si (KR); SeongMo Hwang, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 187 days.

(21) Appl. No.: 14/149,633

(22) Filed: Jan. 7, 2014

(65) Prior Publication Data

US 2014/0354560 A1    Dec. 4, 2014

(30) Foreign Application Priority Data

May 28, 2013  (KR) .................. 10-2013-0060466

(51) Int. Cl.
  *G06F 3/041*  (2006.01)
  *G06F 3/044*  (2006.01)
  *G06F 3/046*  (2006.01)

(52) U.S. Cl.
  CPC ............... *G06F 3/041* (2013.01); *G06F 3/044* (2013.01); *G06F 3/046* (2013.01); *G06F 3/0416* (2013.01); *G06F 2203/04103* (2013.01); *G06F 2203/04106* (2013.01); *G06F 2203/04111* (2013.01)

(58) Field of Classification Search
  CPC . G06F 3/041044; G06F 3/046; G06F 3/0416; G06F 3/047; G06F 2203/04106; G06F 2203/04111; G02F 1/1333; G02F 1/13338; G02F 1/133512; G02F 1/136209; G02F 1/134363; G02F 2001/134372
  USPC ............. 349/12, 110, 139–143; 345/173–174
  See application file for complete search history.

(56) References Cited

U.S. PATENT DOCUMENTS

| | | |
|---|---|---|
| 4,878,553 A | 11/1989 | Yamanami et al. |
| 8,217,918 B2 | 7/2012 | Morag et al. |
| 2004/0095333 A1 | 5/2004 | Morag et al. |
| 2008/0055272 A1* | 3/2008 | Anzures ................ G06F 1/1626 345/173 |
| 2009/0091551 A1 | 4/2009 | Hotelling et al. |
| 2010/0051356 A1 | 3/2010 | Stern et al. |
| 2010/0085325 A1 | 4/2010 | King-Smith et al. |
| 2010/0149116 A1* | 6/2010 | Yang ..................... G06F 3/0416 345/173 |
| 2010/0155153 A1 | 6/2010 | Zachut |
| 2010/0177060 A1 | 7/2010 | Han |

(Continued)

FOREIGN PATENT DOCUMENTS

| | | |
|---|---|---|
| JP | 2010-086510 | 4/2010 |
| KR | 10-2011-0127107 | 11/2011 |

(Continued)

*Primary Examiner* — Kent Chang
*Assistant Examiner* — Herbert L Hagemeier
(74) *Attorney, Agent, or Firm* — H.C. Park & Associates, PLC

(57) ABSTRACT

A display device includes a first display substrate, which provides an input surface and includes a blocking area and a plurality of opening areas, and first and second touch sensors disposed in the blocking area. The first touch sensors receive different scan signals according to an operation mode thereof. The second touch sensors output first sensing signals on the basis of a variation in capacitance in a first operation mode and output second sensing signals according to a resonant frequency of an input device in a second operation mode.

29 Claims, 27 Drawing Sheets

(56) References Cited

U.S. PATENT DOCUMENTS

| | | |
|---|---|---|
| 2011/0018840 A1 | 1/2011 | Fann et al. |
| 2011/0069022 A1 | 3/2011 | Yokota et al. |
| 2011/0122087 A1 | 5/2011 | Jang et al. |
| 2011/0148811 A1 | 6/2011 | Kanehira et al. |
| 2011/0157079 A1* | 6/2011 | Wu .................. G06F 3/044 345/174 |
| 2011/0175844 A1 | 7/2011 | Berggren |
| 2011/0316809 A1* | 12/2011 | Kim .................. G06F 3/0412 345/174 |
| 2012/0013555 A1 | 1/2012 | Maeda et al. |
| 2012/0086668 A1 | 4/2012 | Wang et al. |
| 2012/0092279 A1 | 4/2012 | Martin |
| 2012/0092577 A1* | 4/2012 | Shi .................. G02F 1/13338 349/43 |
| 2012/0105361 A1 | 5/2012 | Kremin et al. |
| 2012/0169400 A1* | 7/2012 | Liu .................. G06F 3/0416 327/517 |
| 2012/0200511 A1* | 8/2012 | Kim .................. G06F 3/0421 345/173 |
| 2013/0147730 A1* | 6/2013 | Chien .................. G06F 3/0412 345/173 |
| 2013/0194224 A1* | 8/2013 | Lai .................. G06F 3/044 345/174 |

FOREIGN PATENT DOCUMENTS

| | | |
|---|---|---|
| KR | 10-2012-0057047 | 6/2012 |
| KR | 10-1154157 | 6/2012 |

* cited by examiner

DISPLAY DEVICE

CROSS-REFERENCE TO RELATED APPLICATION

This U.S. non-provisional patent application claims priority under 35 U.S.C. §119 of Korean Patent Application No. 10-2013-0060466, filed on May 28, 2013, the contents of which are hereby incorporated by reference in its entirety.

BACKGROUND

1. Field of Disclosure

The present disclosure relates to a display device. More particularly, the present disclosure relates to a display device capable of sensing a touch event.

2. Discussion of the Background

In general, a touch panel is an input device to receive information. The touch panel calculates coordinate information of an input position at which a touch event occurs. A display device displays the information provided from the touch panel.

The touch panel may be separately manufactured and then attached to the display panel. Touch panels are classified into a resistive film type of touch panel, an electrostatic capacitive type of touch panel, and an electromagnetic induction type of touch panel depend on the panel's operational principle.

SUMMARY

The present disclosure provides a display device having a touch panel that may operate in two modes.

Embodiments of the inventive concept provide a display device including a first display substrate, a second display substrate, first touch sensors, and second touch sensors. The first display substrate includes a blocking area and a plurality of opening areas. The second display substrate faces the first display substrate.

Each of the first touch sensors is disposed in the blocking area and includes first sensor portions arranged in a first direction and first connection portions connecting the first sensor portions. Each of the second touch sensors is disposed in the blocking area to be insulated from the first touch sensors while crossing the first touch sensors and includes second sensor portions arranged in a second direction crossing the first direction and second connection portions connecting the second sensor portions.

The first touch sensors receive first scan signals in a first operation mode and receive second scan signals in a second operation mode, and the first sensor portions induce a magnetic field according to a corresponding second scan signal of the second scan signals. Each of the second touch sensors outputs first sensing signals on the basis of a variation in capacitance in the first operation mode and outputs second sensing signals according to a resonant frequency of an input device, which is applied to the second sensor portions.

Embodiments of the inventive concept also provide a method for operating a touch panel. The method includes receiving a mode selection signal, the mode selection signal indicating whether the touch panel operates in a first operating mode or a second operating mode, applying first scan signals to first ends of first touch sensors in the first operating mode, applying second scan signals to the first ends of the first touch sensors in the second operating mode, the second scan signals being different from the first scan signals, receiving first sensing signals from first ends of second touch sensors in the first operating mode, and receiving second sensing signals from the first ends of the second touch sensors in the second operating mode.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
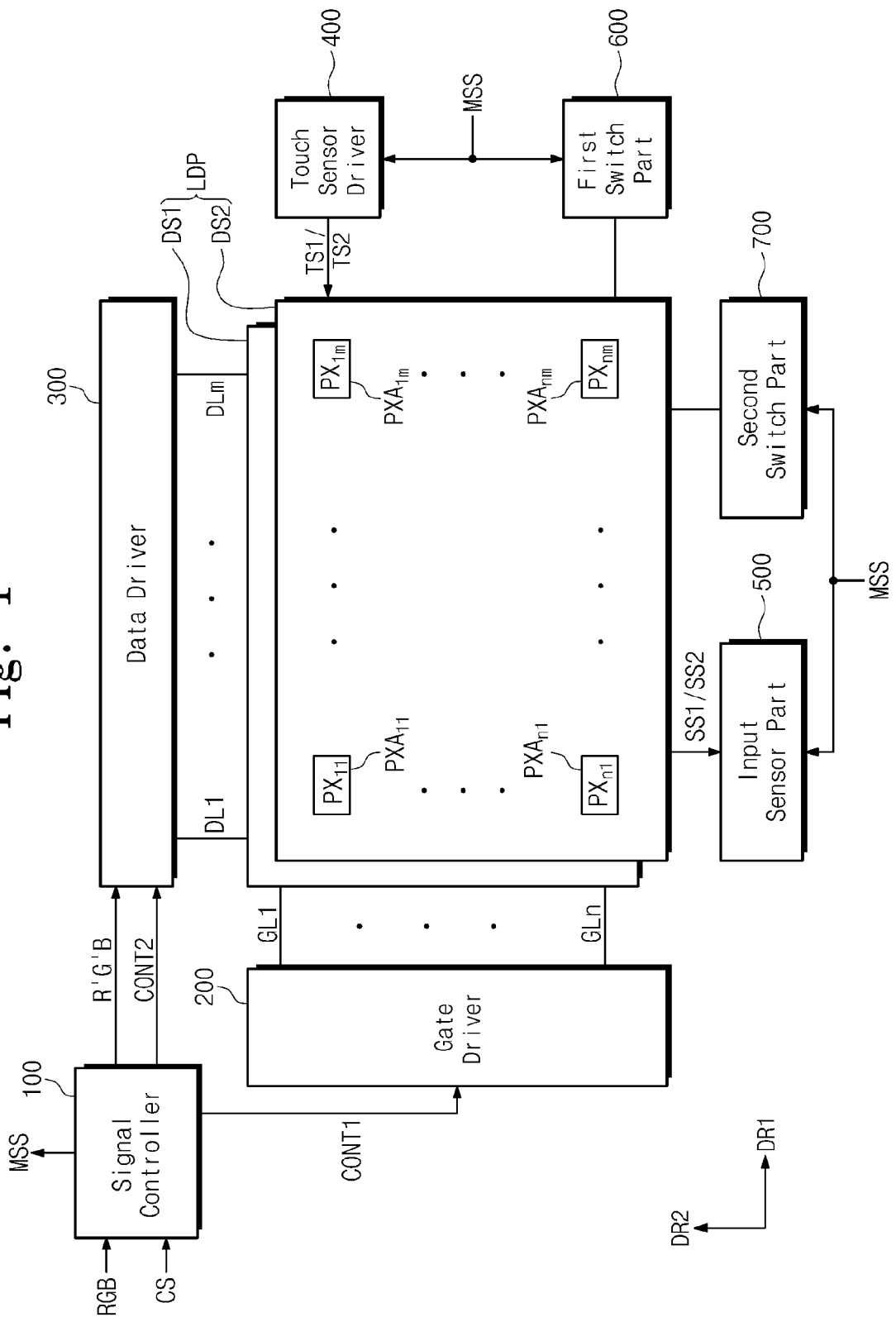
FIG. 1 is a block diagram showing a display device according to an exemplary embodiment of the present disclosure.

It will be understood that when an element or layer is referred to as being "on", "connected to" or "coupled to"

another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be explained in detail with reference to the accompanying drawings.

Figure 2:
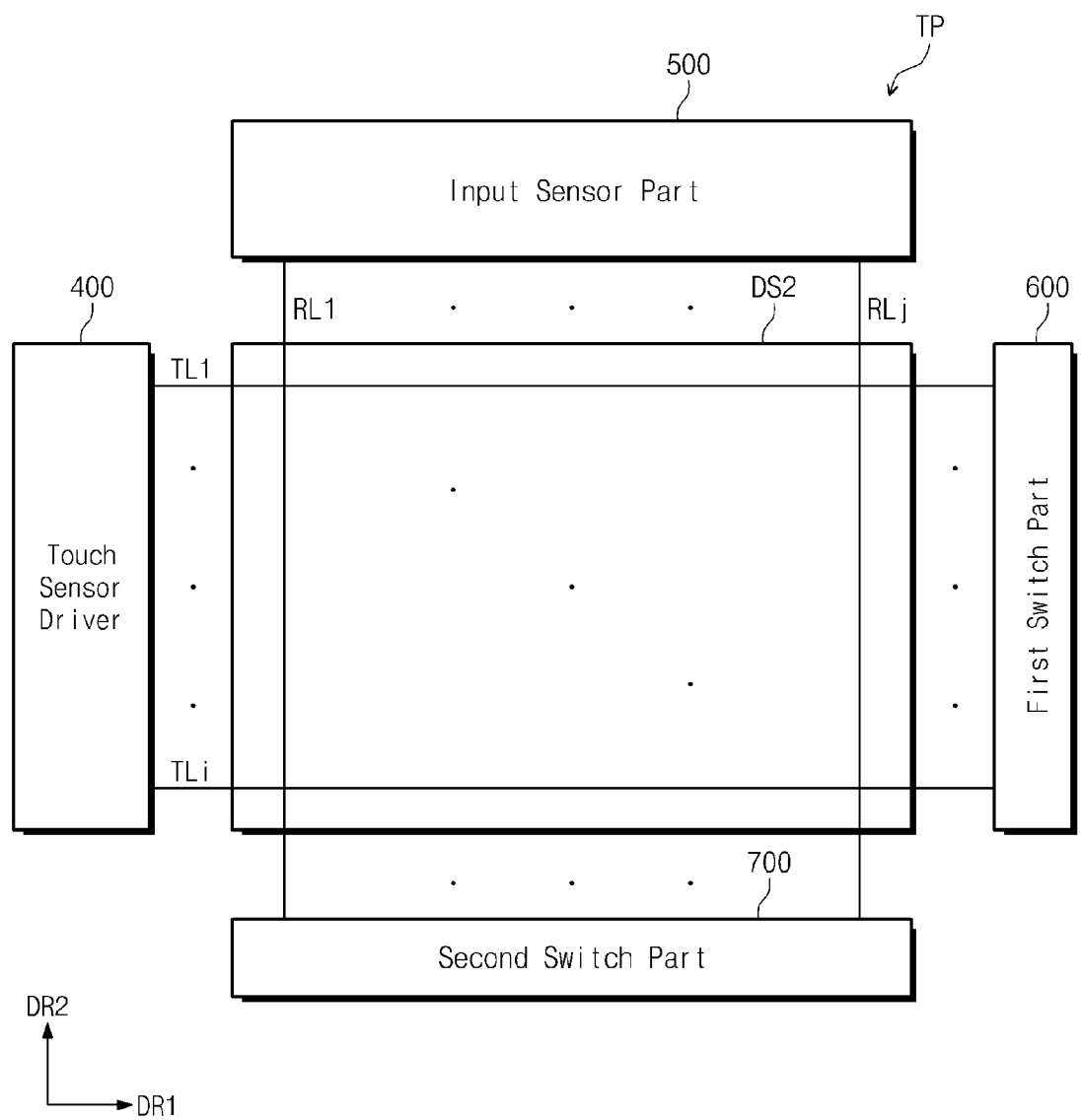
FIG. 2 is a block diagram showing a touch panel included in a display device.
Figure 3:
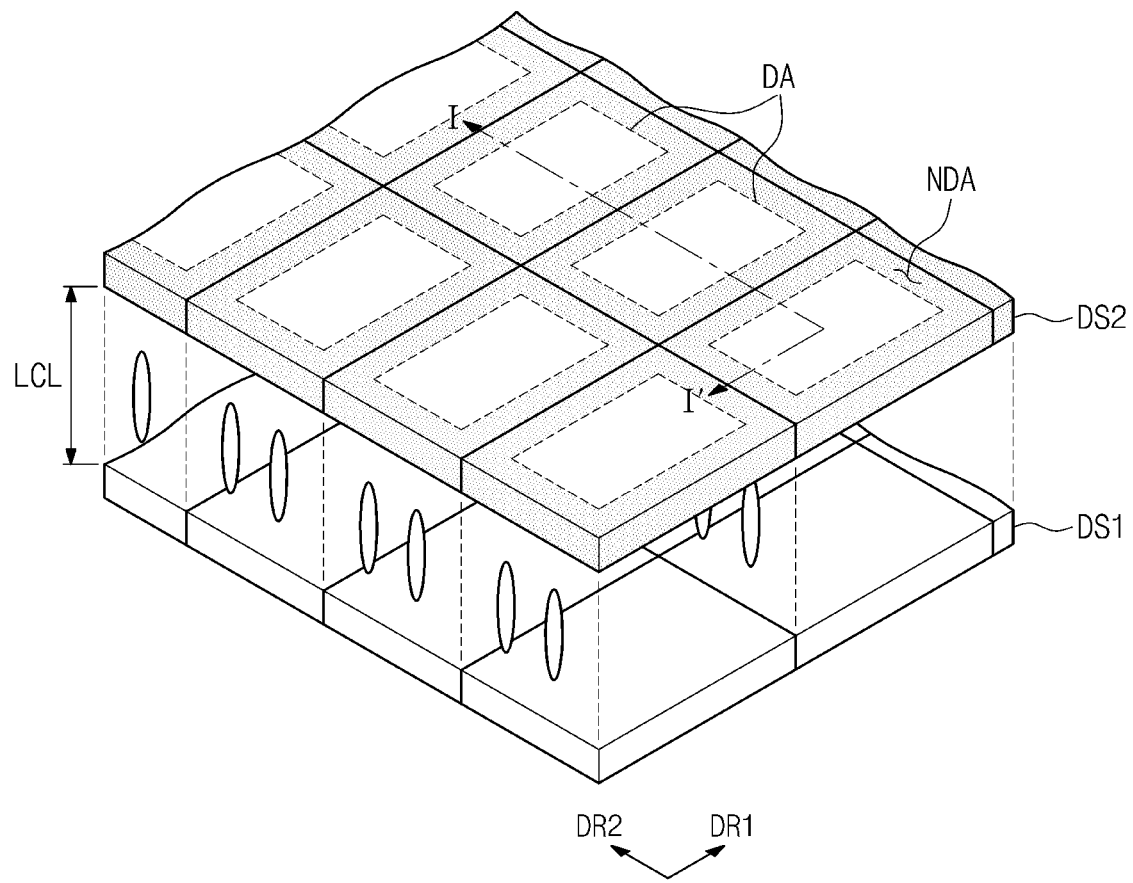
FIG. 3 is a perspective view showing a display panel shown in FIG. 1.
Figure 4:
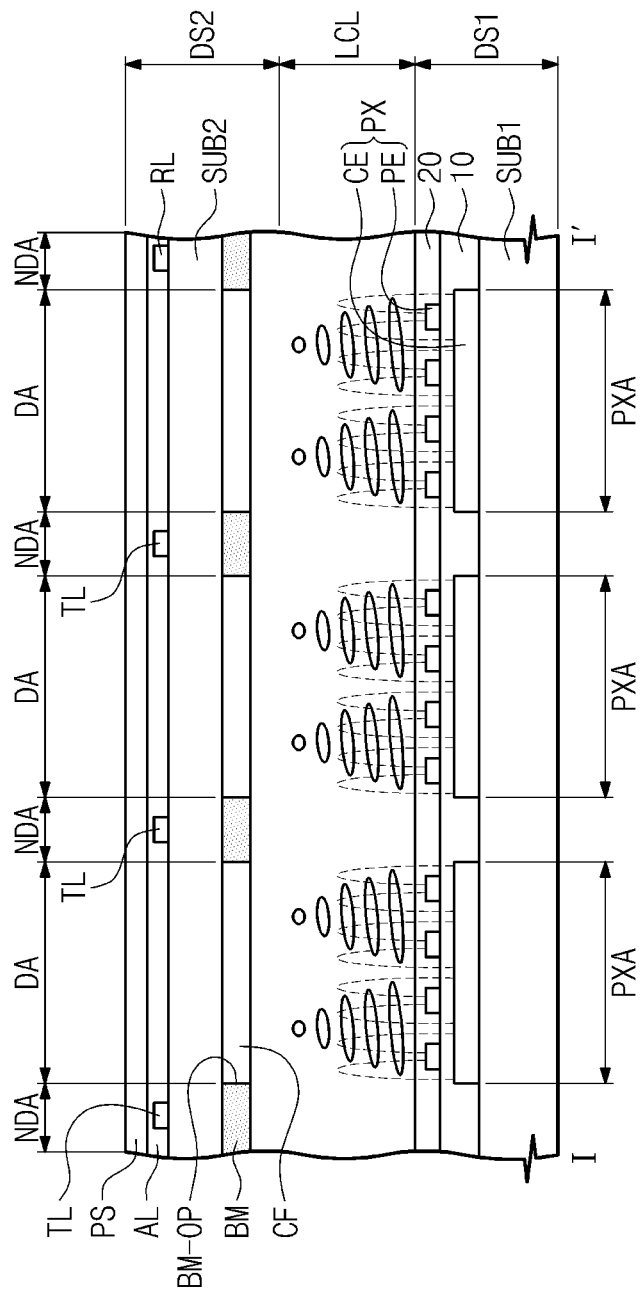
FIG. 4 is a cross-sectional view taken along a line I-I' shown in FIG. 3.

FIG. 1 is a block diagram showing a display device according to an exemplary embodiment of the present disclosure, FIG. 2 is a block diagram showing a touch panel included in a display device, FIG. 3 is a perspective view showing a display panel shown in FIG. 1, and FIG. 4 is a cross-sectional view taken along a line I-I' shown in FIG. 3.

Referring to FIG. 1, the display device includes a display panel LDP, a signal controller 100, a gate driver 200, a data driver 300, a touch sensor driver 400, an input sensor part 500, a first switch part 600, and a second switch part 700. The signal controller 100, the gate driver 200, and the data driver 300 control the display panel LDP to generate an image. The touch sensor driver 400, the first switch part 600, and the second switch part 700 control touch sensors, and the input sensor part 500 calculates coordinate information of input positions. Although FIG. 1 shows the touch sensor driver 400 and the first switch part 600 on the same side of the display panel LDP, this is merely for convenience. For example, as FIG. 2 shows, the touch sensor driver 400 and the first switch part 600 may be disposed on opposite sides of the display panel LDP. Similarly, although FIG. 1 shows the input sensor part 500 and the second switch part 700 on the same side of the display panel LDP, this is merely for convenience. For example, as FIG. 2 shows, the input sensor part 500 and the second switch part 700 may be disposed on opposite sides of the display panel LDP.

Various display panels, such as a liquid crystal display panel, an organic light emitting display panel, an electrophoretic display panel, an electrowetting display panel, etc., may be used as the display panel LDP. In the present exemplary embodiment, the liquid crystal display panel will be described as the display panel LDP. In some cases, the liquid crystal display panel may further include a backlight unit (not shown) to supply a light to the liquid crystal display panel and a pair of polarizing plates (not shown).

The display panel LDP includes a first display substrate DS1 and a second display substrate DS2, which are disposed to be spaced apart from each other. A liquid crystal layer LCL (refer to FIG. 3) is disposed between the first and second display substrates DS1 and DS2.

The display panel LDP includes a plurality of pixels PX11 to PXnm, which may be arranged in a matrix form. The pixels PX11 to PXnm are arranged in a plurality of pixel areas PXA11 to PXAnm, respectively. Each pixel PX11 to PXnm is connected to a corresponding gate line of gate lines GL1 to GLn and a corresponding data line of data lines DL1 to DLm.

The gate lines GL1 to GLn and the data line DL1 to DLm are disposed on the first display substrate DS1. The gate lines GL1 to GLn extend in a first direction DR1 and are arranged in a second direction DR2 substantially perpendicular to the first direction DR1. The data lines DL1 to DLm extend in the second direction DR2 and arranged in the first direction DR1. The data lines DL1 to DLm are insulated from the gate lines GL1 to GLn while crossing the gate lines GL1 to GLn. The gate lines GL1 to GLn are connected to the gate driver 200, and the data lines DL1 to DLm are connected to the data driver 300.

Referring to FIG. 2, a plurality of first touch sensors TL1 to TLi and a plurality of second touch sensors RL1 to RLj are disposed on the second display substrate DS2. The first touch sensors TL1 to TLi are insulated from the second touch sensors RL1 to RLj while crossing the second touch sensors RL1 to RLj. FIG. 2 schematically shows the first touch sensors TL1 to TLi and the second touch sensors RL1 to RLj.

The first touch sensors TL1 to TLi extend in the first direction DR1 and are arranged in the second direction DR2. The second touch sensors RL1 to RLj extend in the second direction DR2 and are arranged in the first direction DR1. First ends of the first touch sensors TL1 to TLi are connected to the touch sensor driver 400, and second ends of the first touch sensors TL1 to TLi are connected to the first switch part 600. First ends of the second touch sensors RL1 to RLj are connected to the input sensor part 500, and second ends of the second touch sensors RL1 to RLj are connected to the second switch part 700. The touch sensor driver 400, the input sensor part 500, the first switch part 600, and the second switch part 700 form a touch panel TP. In other words, the touch panel TP may be configured to include various elements.

Referring to FIGS. 3 and 4, the first display substrate DS1 and the second display substrate DS2 face each other with the liquid crystal layer LCL disposed therebetween. The second display substrate DS2, through which an image may be viewed, provides an input surface for an input device, e.g., user's finger, stylus pen, etc.

As shown in FIG. 3, the second display substrate DS2 includes a plurality of opening areas DA and a blocking area NDA. The blocking area NDA surrounds the opening areas DA. The opening areas DA transmit light generated by and provided from the backlight unit, and the blocking area NDA blocks the light. The opening areas DA are arranged corresponding to the pixel areas PXA11 to PXnm. For example, the opening areas DA may be arranged in a matrix form. The display device generates the image by combining the light transmitting through the opening areas DA.

As shown in FIG. 4, the first display substrate DS1 includes a first base substrate SUB1, a plurality of insulating layers 10 and 20, and a plurality of conductive layers CE and PE. More specifically, common electrodes CE are disposed on the first base substrate SUB1. A first insulating layer 10 is disposed on the first base substrate SUB1 to cover the common electrodes CE. Pixel electrodes PE are disposed on the first insulating layer 10 to correspond to the common electrodes CE. A second insulating layer 20 is disposed on the first insulating layer 10 to cover the pixel electrodes PE. Each of the first and second insulating layers 10 and 20 may include at least one organic layer and/or at least one inorganic layer.

The gate lines GL1 to GLn (refer to FIG. 1) and the data lines DL1 to DLm (refer to FIG. 1) are not shown in FIG. 4. In addition, an insulating layer may be further disposed between the first base substrate SUB1 and the common electrodes CE.

The pixel areas PXA are defined in the first display substrate DS1 and overlapped with the opening areas DA, respectively. As an example, FIG. 4 shows three pixel areas PXA and three opening areas DA.

Each of the three pixels PX includes a corresponding common electrode of the common electrodes CE, a corresponding pixel electrode of the pixel electrodes PE, and a thin film transistor (not shown). The thin film transistor is connected to a corresponding data line of the data lines DL1 to DLm, a corresponding gate line of the gate lines GL1 to GLn, and a corresponding pixel electrode of the pixel electrodes PE. The thin film transistor applies a corresponding data voltage to a corresponding pixel electrode PE in response to a corresponding gate voltage.

The common electrode CE receives a common voltage. The common electrode CE and the pixel electrode PE form a horizontal electric field, which changes arrangements of directors included in the liquid crystal layer LCL.

According to another embodiment, the common electrode CE and the pixel electrode PE may be disposed on the same layer. According to yet another embodiment, the common electrode CE may be disposed on the second display substrate DS2 with the pixel electrode on the first display substrate DS1, such that the common electrode CE and the pixel electrode PE form a vertical electric field.

As shown in FIG. 4, the second display substrate DS2 includes a second base substrate SUB2, a black matrix BM, and a plurality of color filters CF. FIG. 4 shows three first touch sensors TL and one second touch sensor RL.

The black matrix BM is disposed on a lower surface of the second base substrate SUB2. The black matrix BM includes a plurality of openings BM-OP formed therethrough. The opening areas DA are defined by the openings BM-OP. The black matrix BM may include the openings BM-OP corresponding to the pixel areas PXA. For example, the openings BM-OP may be arranged in a matrix form when viewed in a plan view. The blocking area NDA is defined by the black matrix BM.

The color filters CF are respectively disposed in the openings BM-OP. In some exemplary embodiments, the color filters CF may include color filters having different colors from each other. For example, a portion of the color filters may be configured to emit red light, another portion of the color filters may be configured to emit green light, and the other portion of the color filters may be configured to emit blue light. Other configurations are possible. For example, the color filters CF may be configured to emit other colors, or may be configured to emit white light. In some cases, color converting layers (not shown) may be included along with the color filters CF.

In FIG. 4, the first touch sensors TL and the second touch sensors RL are disposed on an upper surface of the second base substrate SUB2. At least a portion of the first touch sensors TL and at least a portion of the second touch sensors RL are disposed on the same layer. The first touch sensors TL and the second touch sensors RL are disposed to overlap with the blocking area NDA. The arrangements of the first and second touch sensors TL and RL will be described in detail below with reference to FIGS. 5 to 9.

The first touch sensors TL and the second touch sensors RL, which are disposed on the upper surface of the second base substrate SUB2, may be made of a metallic material with a low reflectivity. For example, the first touch sensors TL and the second touch sensors RL may include chromium oxide, chromium nitride, titanium oxide, titanium nitride, or alloys thereof.

An insulating layer AL is disposed on the second base substrate SUB2 to cover the first touch sensors TL and the second touch sensors RL. The insulating layer AL may include at least one organic layer and/or at least one inorganic layer. A protective layer PS is disposed on the insulating layer AL. The protective layer PS may be, for example, a tempered glass or a polarizing plate.

According to another embodiment, positions of the first display substrate DS1 and the second display substrate DS2 may be switched. In more detail, the first display substrate DS1 and the second display substrate DS2 are rotated at about 180 degrees with respect to the liquid crystal layer LCL. In this case, the first touch sensors TL and the second touch sensors RL are disposed on the second base substrate SUB2.

The display device shown in FIG. 4 may be manufactured by separately manufacturing the first display substrate DS1 and the second display substrate DS2 and then coupling the first display substrate DS1 and the second display substrate DS2 together. A liquid crystal may be injected between the first display substrate DS1 and the second display substrate DS2, which are coupled to each other, to form the liquid crystal layer LCL. After the liquid crystal is injected, the first touch sensors TL and the second touch sensors RL may be formed on the second display substrate DS2. Then, the insulating layer AL and the protective layer PS may be disposed on the second display substrate DS2. Detailed descriptions of forming the first touch sensors TL and the second touch sensors RL will be described below. According to another embodiment, the first display substrate DS1 and the second display substrate DS2 may be coupled to each other after forming the second display substrate DS2 including the first touch sensors TL, the second touch sensors RL, the insulating layer AL, and the protective layer PS.

Referring to FIGS. 1 and 2 again, the signal controller 100 receives input image signals RGB and converts the input image signals RGB to image data R'G'B' appropriate to an operating mode of the display panel LDP. In addition, the signal controller 100 receives various control signals CS, such as a vertical synchronizing signal, a horizontal synchronizing signal, a main clock signal, a data enable signal, etc., and outputs first and second control signals CONT1 and CONT2 and a mode selection signal MSS.

The mode selection signal MSS determines the operating mode of the touch panel TP. The touch panel TP may be operated in two modes. For example, the touch panel TP of FIG. 2 may be operated in an electrostatic capacitive mode or an electromagnetic induction mode. The mode selection signal MSS is generated as an operation mode activation signal according to the operating mode of the touch panel TP. For example, the mode selection signal MSS may be generated as the activation signal at a high level during a first operation mode period and as the activation signal at a low level during a second operation mode period, or vice versa.

The mode selection signal MSS may be generated on the basis of the image displayed in the display panel LDP. For example, when the display panel LDP displays a keypad image, the mode selection signal MSS may be output as a signal to activate the first operation mode, and when the display panel LDP displays a game image, the mode selection signal MSS may be output as a signal to activate the second operation mode. Therefore, when the display panel LDP displays a keypad image, the touch panel TP is operated in the electrostatic capacitive mode, and when the display panel LDP displays a game image, the touch panel TP is operated in the electromagnetic induction mode. Besides, the mode selection signal MSS may be generated by a user. The user may be select one of the first operation mode and the second operation mode using a key pad or the touch panel.

The gate driver 200 applies gate signals to the gate lines GL1 to GLn in response to the first control signal CONT1. The first control signal CONT1 may include a vertical start signal to start an operation of the gate driver 200, a gate clock signal to determine an output timing of a gate voltage, and an output enable signal to determine an ON-pulse width of the gate voltage.

The data driver 300 receives the second control signal CONT2 and the image data R'G'B'. The data driver 300 converts the image data R'G'B' to data voltages and applies the data voltages to the data lines DL1 to DLm.

The second control signal CONT2 may include a horizontal start signal to start an operation of the data driver 300, an inverting signal to invert a polarity of the data voltages, and an output indicating signal to determine an output timing of the data voltages from the data driver 300.

The touch sensor driver 400 receives the mode selection signal MSS. The touch sensor driver 400 applies scan signals to the first touch sensors TL1 to TLi in response to the mode selection signal MSS. The touch sensor driver 400 outputs first scan signals TS1 in the first operation mode and outputs second scan signals TS2 in the second operation mode to the first touch sensors TL1 to TLi.

The input sensor part 500 receives a first sensing signal SS1 that represents a variation in capacitance of the second touch sensors RL1 to RLj during the first operation mode. The input sensor part 500 receives a second sensing signal SS2 according to a resonant frequency of an input device in the second touch sensors RL1 to RLj during the second operation mode. Here, the input device may be, but not limited to, a stylus pen with an LC resonant circuit including an inductor and a capacitor.

The input sensor part 500 calculates the coordinate information of the input positions based on the first sensing signal SS1 and the second sensing signal SS2. Here, the input position in the first operation mode may be a position on the second display substrate DS2, on which a touch event occurs. In addition, the input position in the second mode may be a position on the second display substrate DS2, which is touched by the input device, or a position on the second display substrate DS2, to which the input device approaches, but does not touch.

The input sensor part 500 may include a first signal processor (not shown) and a second signal processor (not shown) to respectively process the first sensing signal SS1 and the second sensing signal SS2. The input sensor part 500 may selectively activate the first signal processor and the second signal processor in response to the mode selection signal MSS.

Each of the first and second switch parts 600 and 700 receives the mode selection signal MSS. The first touch sensors TL1 to TLi and the second touch sensors RL1 to RLj may be floated or grounded by the first and second switch parts 600 and 700 according to the received mode selection signal MSS.

Figure 5:
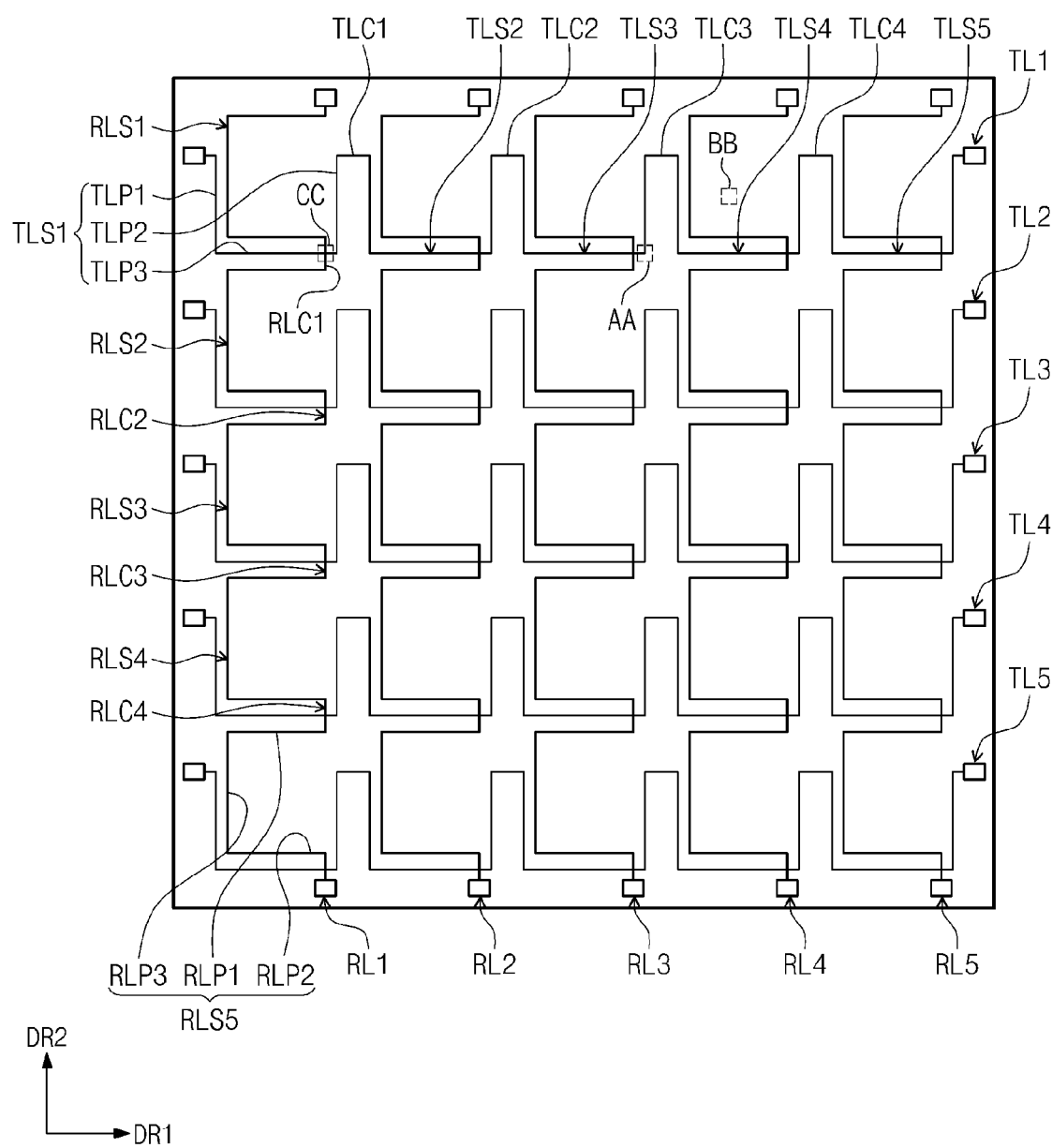
FIG. 5 is a plan view showing first touch sensors and second touch sensors shown in FIG. 2.
Figure 6A:
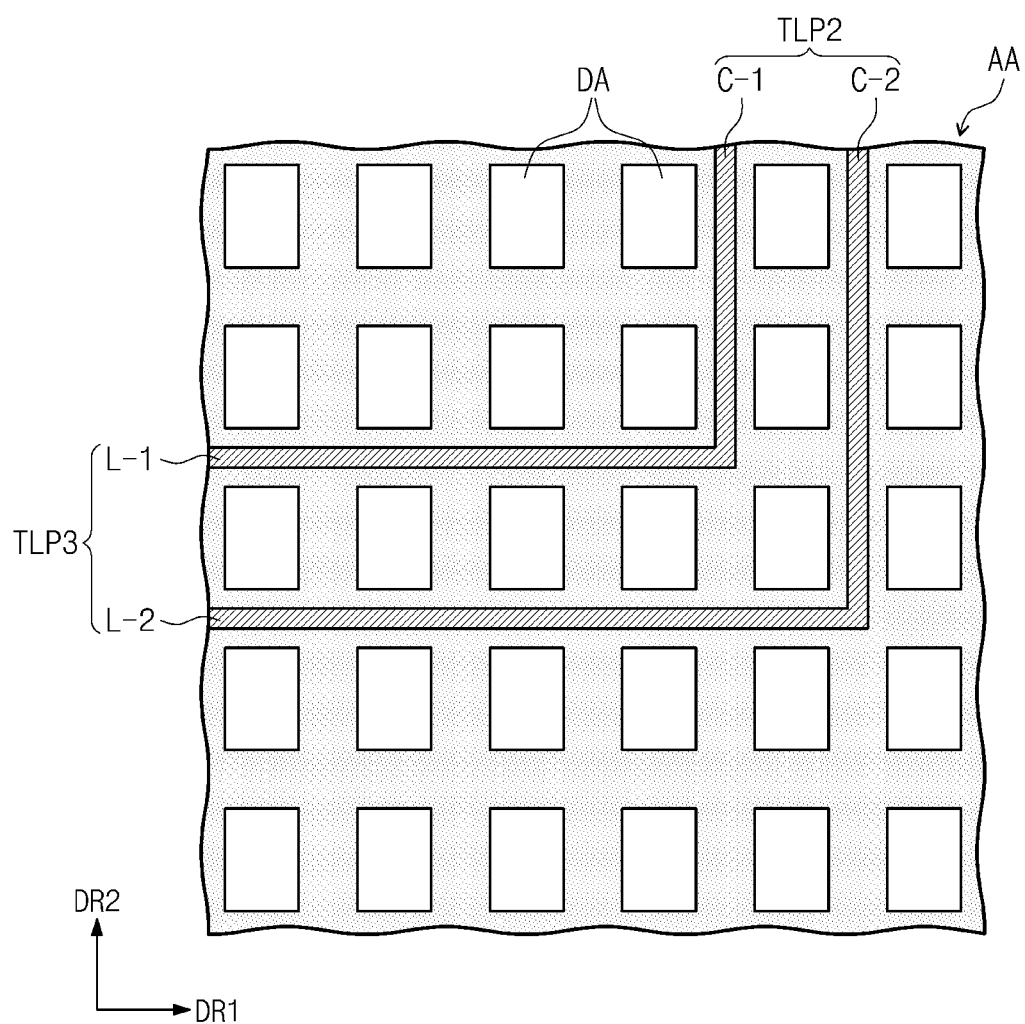
FIGS. 6A and 6B are an enlarged plan view showing a portion AA of FIG. 5.
Figure 6B:
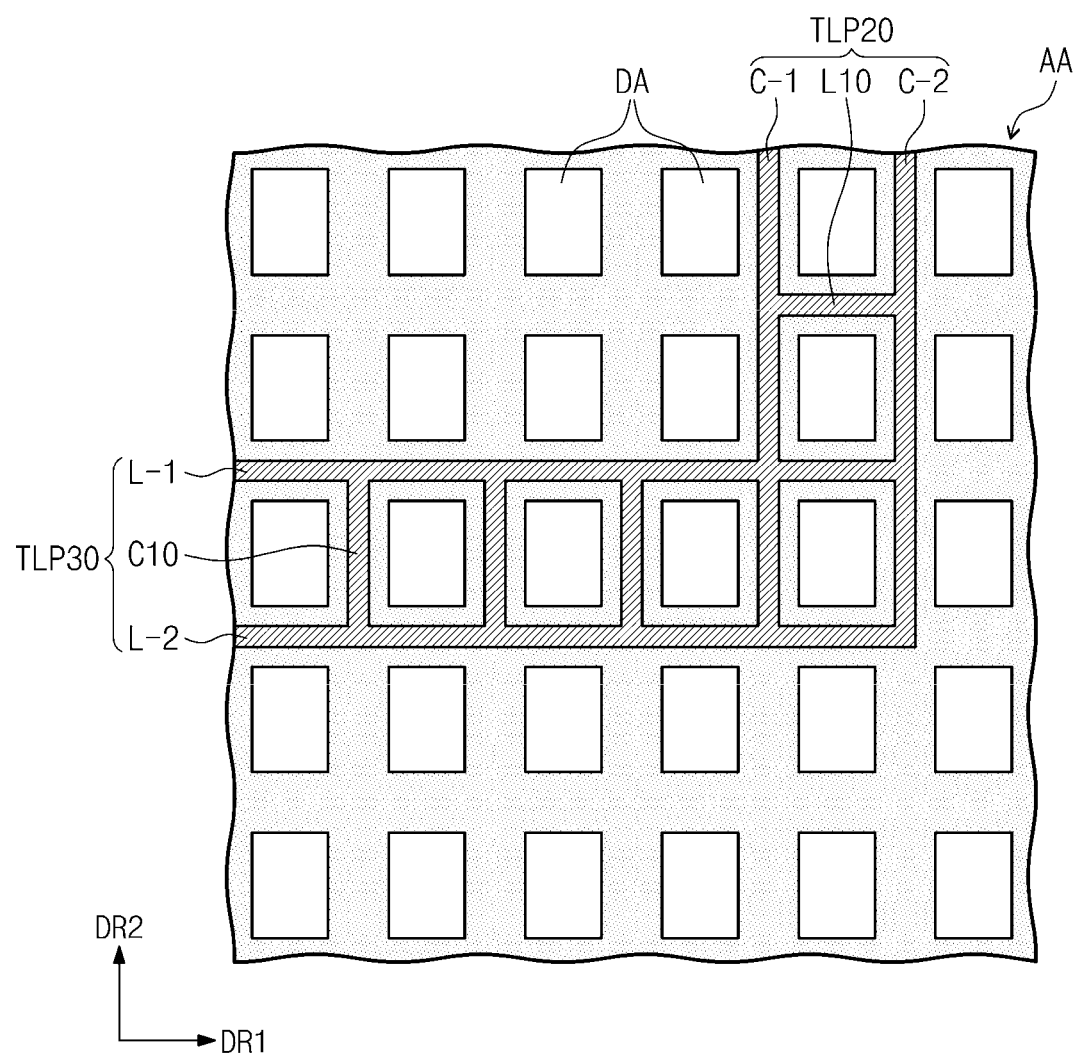
Figure 7:
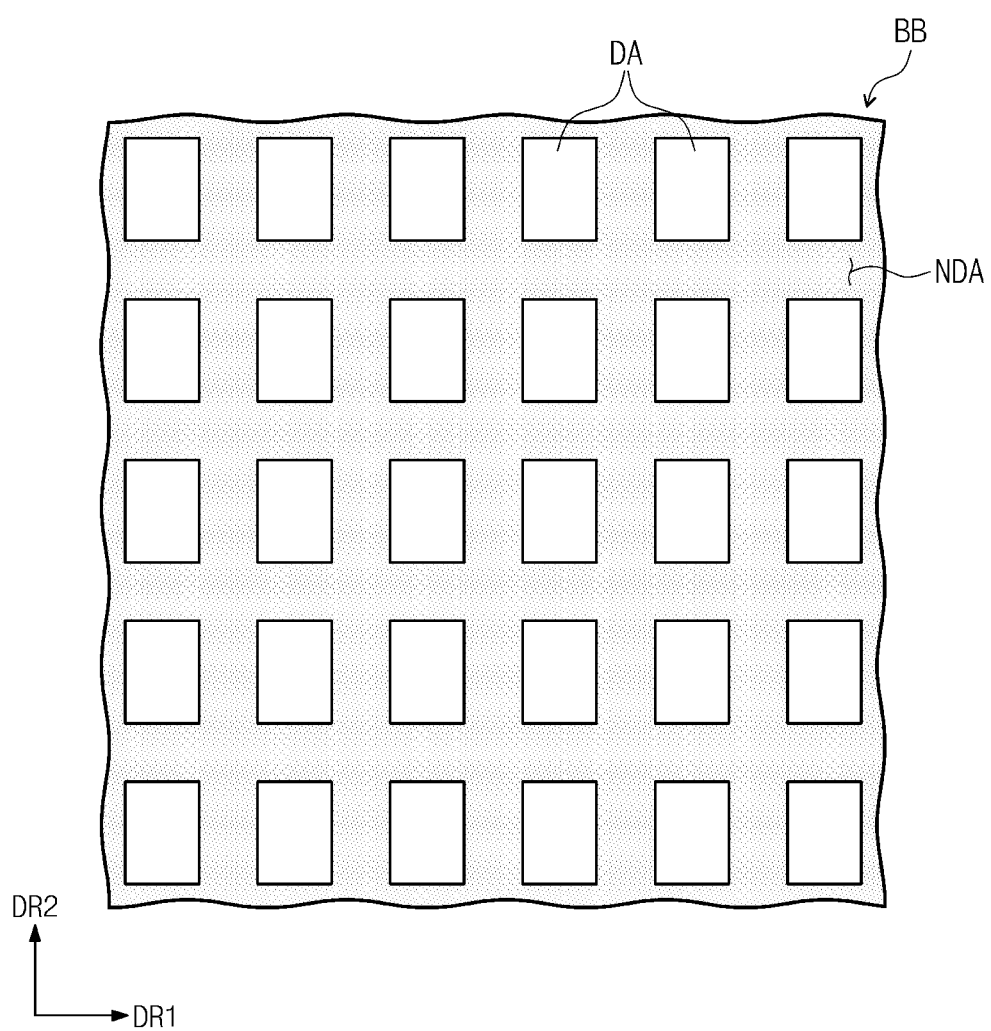
FIG. 7 is an enlarged plan view showing a portion BB of FIG. 5.
Figure 8:
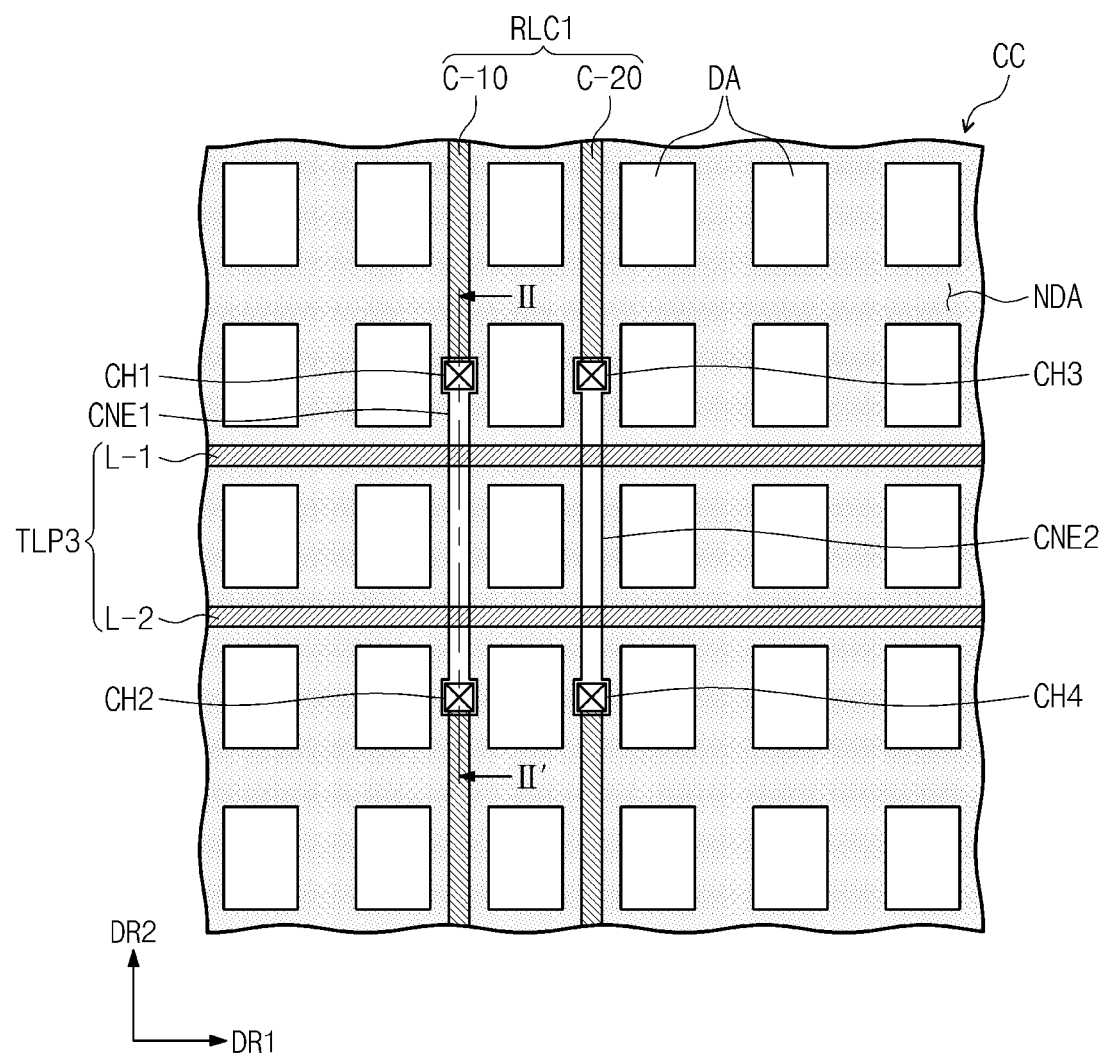
FIG. 8 is an enlarged plan view showing a portion CC of FIG. 5.
Figure 9:
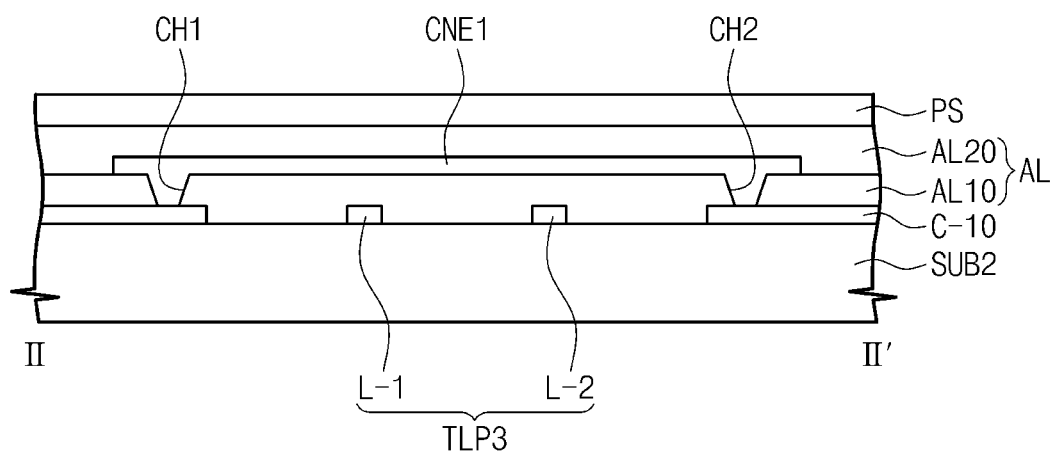
FIG. 9 is a cross-sectional view taken along a line II-II' of FIG. 8.

FIG. 5 is a plan view showing first touch sensors and second touch sensors shown in FIG. 2, FIGS. 6A and 6B are an enlarged plan view showing a portion AA of FIG. 5, FIG. 7 is an enlarged plan view showing a portion BB of FIG. 5, FIG. 8 is an enlarged plan view showing a portion CC of FIG. 5, and FIG. 9 is a cross-sectional view taken along a line II-II' of FIG. 8. Although FIG. 5 shows five first touch sensors TL1 to TL5 and five second touch sensors RL1 to RL5, in some exemplary embodiments of the invention, there may be fewer than five first and second touch sensors, and in others, there may be more than five first and second touch sensors.

Referring to FIG. 5, each of the first touch sensors TL1 to TL5 includes first sensor portions TLS1 to TLS5 arranged in the first direction DR1 and first connection portions TLC1 to TLC4 that connect the first sensor portions TLS1 to TLS5. As shown in FIG. 5, each of the first touch sensors TL1 to TL5 includes five first sensor portions TLS1 to TLS5 and four first connection portions TLC1 to TLC4.

Each of the first sensor portions TLS1 to TLS5 includes a first portion TLP1, a second portion TLP2 facing the first portion TLP1, and a third portion TLP3 that connects the first portion TLP1 and the second portion TLP2. The first portion TLP1, the second portion TLP2, and the third portion TLP3 form a loop shape, which is partially opened, but the shape of the loop should not be limited thereto or thereby.

Each of the first connection portions TLC1 to TLC4 connects two first sensor portions adjacent to each other. One connection portion connects a second portion of one of the two adjacent first sensor portions and a first portion of the other of the two adjacent first sensor portions. For example, the one connection portion may connect an end of the second portion of the one first sensor portion and an end of the first portion of the other first sensor portion.

Each of the second touch sensors RL1 to RL5 includes second sensor portions RLS1 to RLS5 arranged in the second direction DR2 and second connection portions RLC1 to RLC4 that connect the second sensor portions RLS1 to RLS5. As shown in FIG. 5, each of the second touch sensors RL1 to RL5 includes five second sensor portions RLS1 to RLS5 and four second connection portions RLC1 to RLC4.

Each of the second sensor portions RLS1 to RLS5 includes a first portion RLP1, a second portion RLP2, and a third portion RLP3 to form a loop shape, which is partially opened. Each of the second connection portions RLC1 to RLC4 connects two second sensor portions adjacent to each other. As shown in FIG. 5, the second touch sensors RL1 to RL5 may have the same shape as the first touch sensors TL1 to TL5 when rotated in a clockwise direction.

FIG. 6A shows the second portion TLP2 and the third portion TLP3 of the first sensor portion TLS3 of the first touch sensor TL1. The other portions of the first touch sensors TL1 to TL5 and the second touch sensors RL1 to RL5, which are not shown, have the same structure as shown in FIG. 6A.

The second portion TLP2 of the first sensor portion TLS3 includes a plurality of first lines C-1 and C-2, which are extended in the second direction DR2. The third portion TLP3 of the first sensor portion TLS3 includes a plurality of second lines L-1 and L-2 extended in the first direction DR1. In FIG. 6A, two first lines C-1 and C-2 and two second lines L-1 and L-2 have been shown. More lines may be used, and as the number of the first lines C-1 and C-2 and the second lines L-1 and L-2 increases, a resistance of the first touch sensor TL1 decreases.

As shown in FIG. 6B, the second portion TLP20 may further include a plurality of second lines L10 to connect the two first lines C-1 and C-2 in the first direction DR1. The third portion TLP30 may further include a plurality of first lines C10 to connect the two second lines L-1 and L-2 in the second direction DR2. These additional first and second lines may be disposed between adjacent display areas DA.

As shown in FIG. 7, separate electrode patterns are not disposed in areas in which the touch sensors are not arranged.

FIG. 8 is an enlarged view of area CC of FIG. 5, and it shows a crossing area in which the third portion TLP3 of the first sensor portion TLS1 of the first touch sensor TL1 crosses the second connection portion RLC1 of the second touch sensor RL1. The third portion TLP3 includes the second lines L-1 and L-2 extended in the first direction DR1.

The second connection portion RLC1 includes first lines C-10 and C-20. The first lines C-10 and C-20 respectively include bridge electrodes CNE1 and CNE2 disposed in the crossing area.

As shown in FIG. 9, the third portion TLP3 and the second connection portion RLC1 are disposed on the second base substrate SUB2. A third insulating layer AL10 is disposed on the second base substrate SUB2 to cover the third portion TLP3 and the second connection portion RLC1. The third insulating layer AL10 includes a first contact hole CH1 and a second contact hole CH2, which are formed therethrough. The bridge electrode CNE1 connects one portion of the first line C-10 to the other portion of the first line C-10 through the first contact hole CH1 and the second contact hole CH2. A fourth insulating layer AL20 is disposed on the third insulating layer AL10 to cover the bridge electrode CNE1.

A manufacturing method of the touch sensors including the bridge electrodes CNE1 and CNE2 according to an exemplary embodiment will be described below. The first touch sensor TL1 and a portion of the second touch sensor RL1 are formed on the second base substrate SUB2. The first touch sensor RL1 including the second lines L-1 and L-2 and the second touch sensor RL1 including the first lines C-10 and C-20, which are cut-out, may be formed. Here, first lines C-10 and C-20 may be formed and then portions of the lines corresponding to the second lines L-1 and L-2 may be removed. Alternatively, the lines L-1, L-2, C-10, and C-20 may be formed using a mask, such that the first lines C-10 and C-20 are formed with the gaps corresponding to the areas where the first lines C-10 and C-20 cross the second lines L-1 and L-2. Then, the third insulating layer AL10 is formed on the second base substrate SUB2, and the first and second contact holes CH1 and CH2 are formed through the third insulating layer AL10. After that, the bridge electrode CNE1 is formed to connect the first lines C-10 and C-20 through the first and second contact holes CH1 and CH2. The fourth insulating layer AL20 and the protective layer PS are formed.

According to another exemplary embodiment, the bridge electrodes CNE1 and CNE2 may be included in the third portion TLP3 to connect the second lines L-1 and L-2 of the third portions TLP3 instead of being used to connect the second connection portion RLC1. In this case, the second connection portion RLC1 is directly connected through the first lines C-10 and C-20 extended in the second direction DR2 without using the bridge electrodes CNE1 and CNE2.

Figure 10:
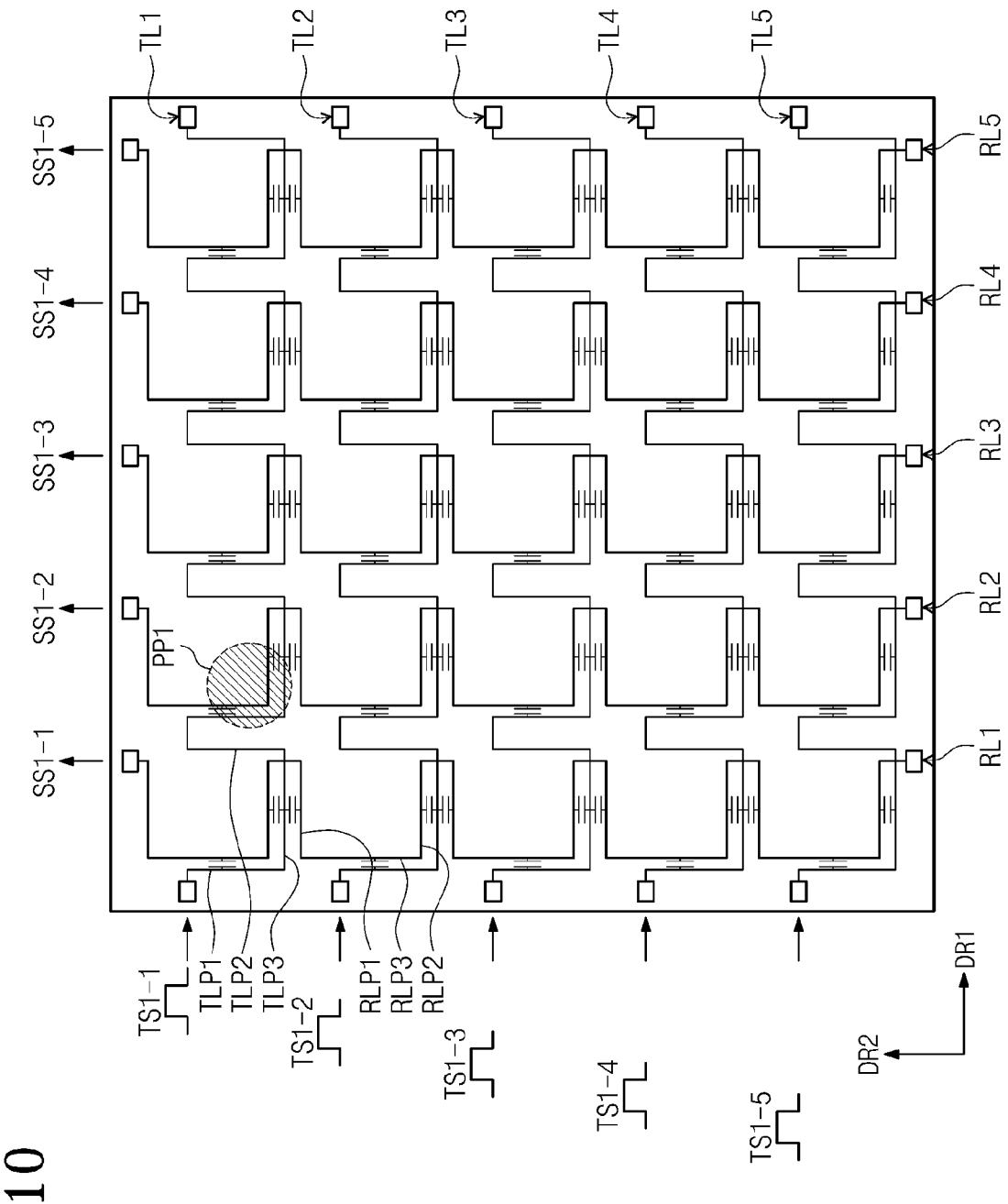
FIG. 10 is a plan view showing a touch panel operated in a first operation mode.
Figure 11:
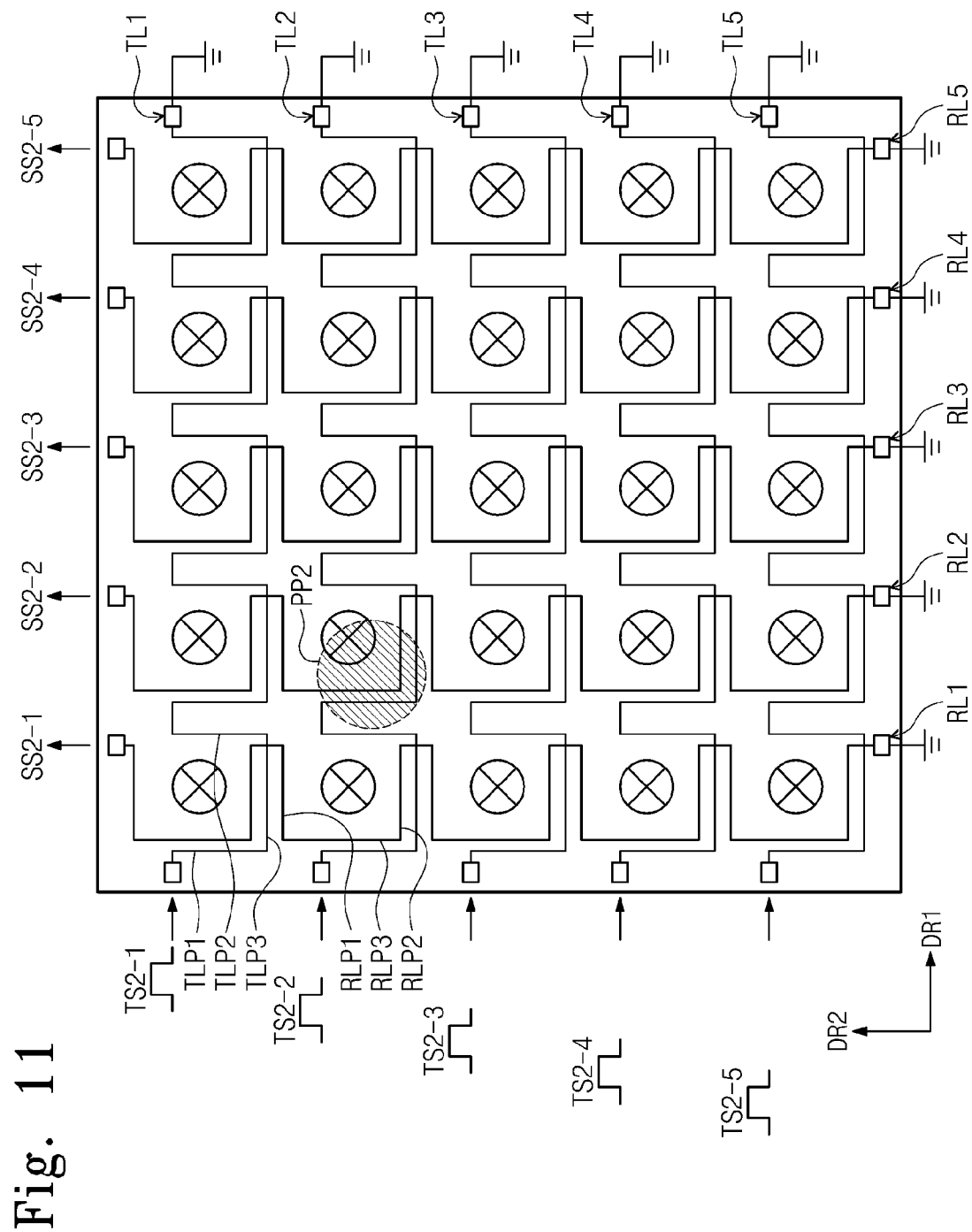
FIG. 11 is a plan view showing a touch panel operated in a second operation mode.
Figure 12:
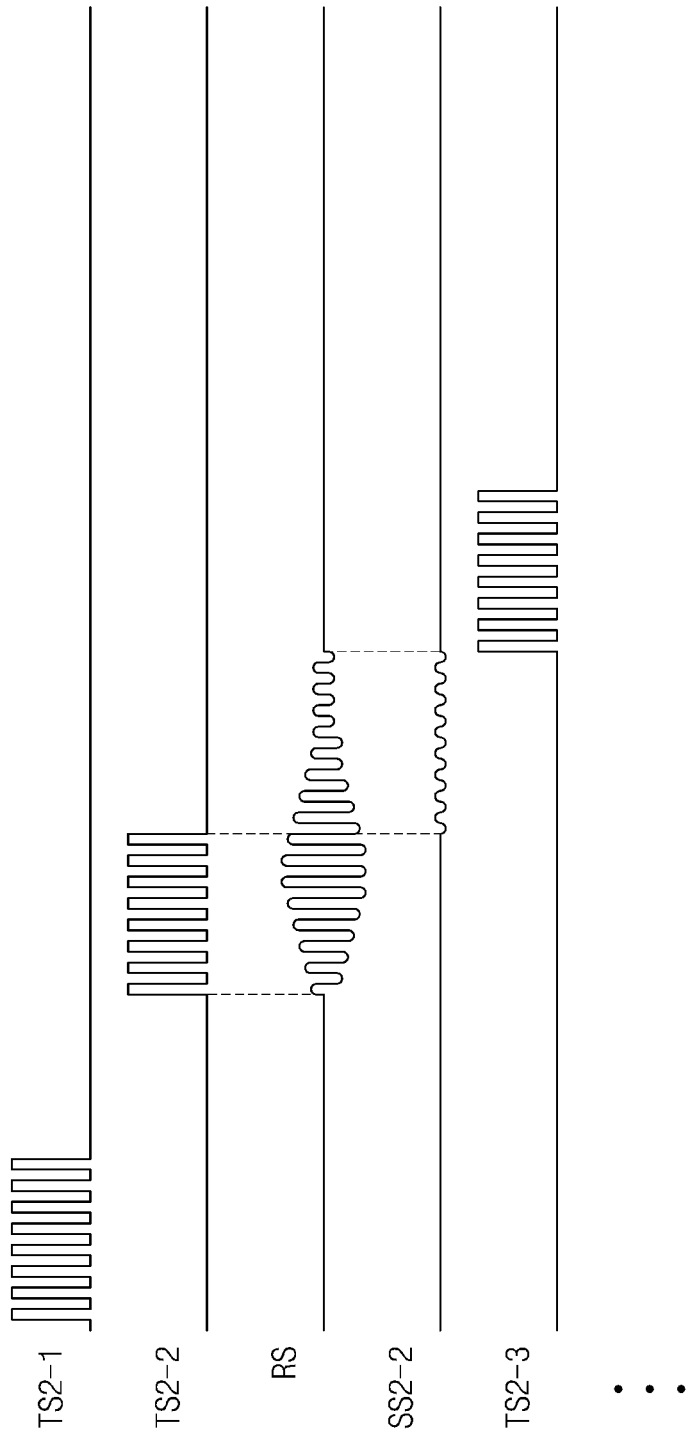
FIG. 12 is a timing diagram showing signals generated in the second operation mode.

FIG. 10 is a plan view showing a touch panel operated in a first operation mode, FIG. 11 is a plan view showing a touch panel operated in a second operation mode, and FIG. 12 is a timing diagram showing signals generated in the second operation mode. Hereinafter, the operating method of the touch panel will be described in detail with reference to FIGS. 10 to 12.

The touch panel shown in FIG. 10 and operated in the first operation mode may calculate the coordinate information of the input position in the same way as the electrostatic capacitive type touch panel. The first touch sensors TL1 to TL5 correspond to input touch electrodes of the electrostatic capacitive type touch panel, and the second touch sensors RL1 to RL5 correspond to output touch electrodes of the electrostatic capacitive type touch panel.

The first touch sensors TL1 to TL5 are capacitive-coupled to the second touch sensors RL1 to RL5. Due to the capacitive coupling, capacitors are formed between the first touch sensors TL1 to TL5 and the second touch sensors RL1 to RL5.

The first portions TLP1 of the first touch sensors TL1 to TL5 are adjacent to and face the third portions RLP3 of the second touch sensors RL1 to RL5 to form capacitors. The third portions TLP3 of the first touch sensors TL1 to TL5 are adjacent to and face the first portions RLP1 and the second portions RLP2 of the second touch sensors RL1 to RL5 to form capacitors.

First ends of the first touch sensors TL1 to TL5 receive scan signals TS1-1 to TS1-5 (hereinafter, referred to as first scan signals) in different periods from each other. The first scan signals TS1-1 to TS1-5 are signals in which an activation period is delayed. While the first scan signals are applied to the first ends of the first touch sensors TL1 to TL5, the second ends of the first touch sensors TL1 to TL5 may be floated. The second touch sensors RL1 to RL5 output sensing signals SS1-1 to SS1-5 (hereinafter, referred to as first sensing signals).

An area in which the first touch sensor TL1 crosses the second touch sensor RL2 is referred to as a first input position PP1. The first sensing signal SS1-2 output from the second touch sensor RL2 has a level different from those of the first sensing signals SS1-1, SS1-3, SS1-4, and SS1-5 of the other second touch sensors RL1, RL3, RL4, and RL5.

The input sensor part 500 calculates a two-dimensional coordinate information about the first input position PP1 based on a time at which the first sensing signal SS1-2 having the different level is sensed and a relative position of the second touch sensor RL2 with respect to the second touch sensors RL1 to RL5.

The touch panel operated in the second operation mode and shown in FIGS. 11 and 12 may calculate the coordinate information of the input position in the same way as the electromagnetic induction type touch panel. The first touch sensors TL1 to TL5 correspond to input coils of the electromagnetic induction type touch panel, and the second touch sensors RL1 to RL5 correspond to output coils of the electromagnetic induction type touch panel.

Referring to FIG. 11, the first touch sensors TL1 to TL5 receive scan signals TS2-1 to TS2-5 (hereinafter, referred to as second scan signals), which are activated in different periods. Each of the first sensor portions TLS1 to TLS5 of the first touch sensors TL1 to TL5 forms a current path.

When the second scan signals TS2-1 to TS2-2 are applied to the first ends of the first touch sensors TL1 to TL5, a direct current voltage, e.g., a ground voltage, may be applied to the second ends of the first touch sensors TL1 to TL5. A magnetic field is induced in the first sensor portions TLS1 to TLS5 by the current path. Since the first touch sensors TL1 to TL5 receive the second scan signals TS2-1 to TS2-5 in different periods, the magnetic field is induced in different periods.

When the input device (not shown) approaches to the first touch sensors TL1 to TL5, the magnetic field induced from the first touch sensors TL1 to TL5 resonates with the resonant circuit of the input device. Thus, the input device generates the resonant frequency.

The second touch sensors RL1 to RL5 receive the resonant frequency from the input device. Second ends of the second touch sensors RL1 to RL5 are applied with the direct current voltage, e.g., the ground voltage. First ends of the second touch sensors RL1 to RL5 are applied with sensing signals SS2-1 to SS2-5 (hereinafter, referred to as second sensing signals) according to the resonant frequency of the input device.

An area in which the second first touch sensor TL2 crosses the second touch sensor RL2 is referred to as a second input position PP2. The second sensing signal SS2-2 output from the second touch sensor RL2 has a level different from the second sensing signals SS2-1, SS2-3, SS2-4, and SS2-5 of the second touch sensors RL1, RL3, RL4, and RL5.

The input sensor part 500 calculates a two-dimensional coordinate information of the second input position PP2 based on a time at which the second sensing signal SS2-2 having the different level is sensed and a relative position of the second touch sensor RL2 with respect to the second touch sensors RL1 to RL5.

As shown in FIG. 12, the second scan signals TS2-1 to TS2-3 are applied to the first touch sensors TL1 to TL3. An induction signal RS is generated from the input device disposed at the second input position PP2.

After the second scan signal TS2-2 applied to the second first touch sensor TL2 is inactivated, the induction signal RS is gradually decreased during a predetermined period. The input device generates a frequency corresponding to the induction signal RS that is gradually decreased. The frequency generated by the input device generates the second sensing signal SS2-2 of the second touch sensor RL2.

Figure 13:
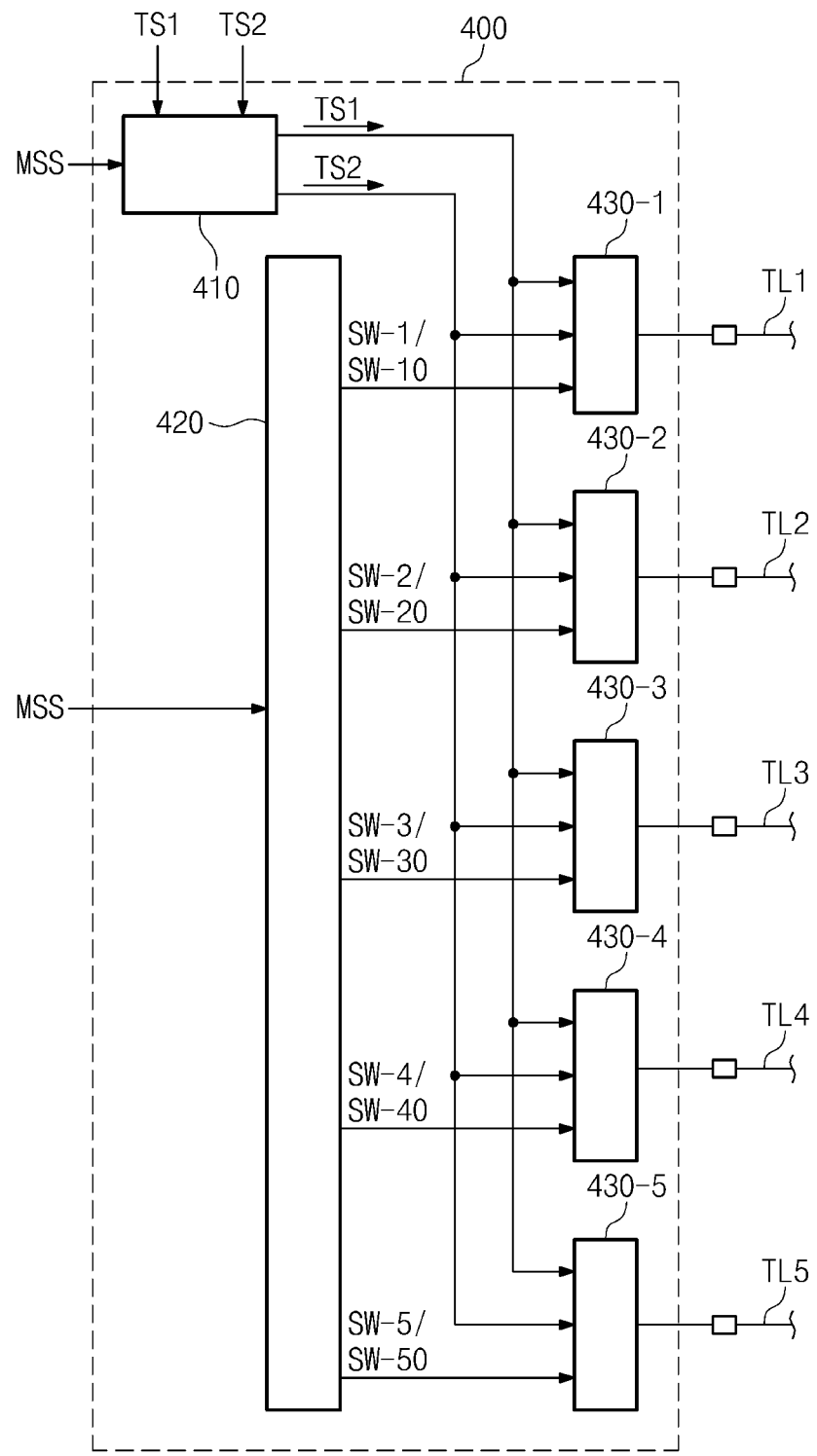
FIG. 13 is a block diagram showing a touch sensor driver shown in FIG. 2.
Figure 14:
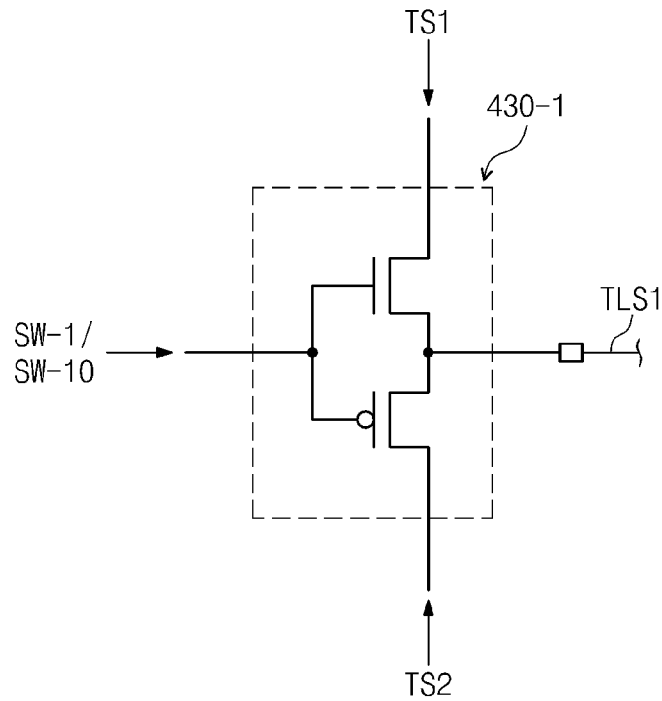
FIG. 14 is a circuit diagram showing a switch shown in FIG. 13.

FIG. 13 is a block diagram showing a touch sensor driver shown in FIG. 2 and FIG. 14 is a circuit diagram showing a switch shown in FIG. 13. Hereinafter, the touch sensor driver will be described in detail with reference to FIGS. 13 and 14.

The touch sensor driver 400 includes a scan signal output part 410, a selection part 420, and switching parts 430-1 to 430-5. FIG. 13 shows five switching parts 430-1 to 430-5 (hereinafter, referred to as first switching parts).

The scan signal output part 410 receives the mode selection signal MSS, the first scan signal TS1, and the second scan signal TS2. The scan signal output part 410 selectively outputs the first scan signal TS1 and the second scan signal TS2 in response to the mode selection signal MSS.

The selection part 420 switches the first switching parts 430-1 to 430-5. The selection part 420 receives the mode selection signal MSS and outputs switching control signals SW-1 to SW-5 and SW-10 to SW-50 having different turn-on periods. The selection part 420 outputs first switching control signals SW-1 to SW-5 in the first operation mode and outputs second switching control signals SW-10 to SW-50 in the second operation mode. The second switching control signals SW-10 to SW-50 have phases opposite to those of the first switching control signals SW-1 to SW-5.

Each of the first switching parts 430-1 to 430-5 receives the first scan signal TS1 from the scan signal output part 410 in the first operation mode and receives the second scan signal TS2 from the scan signal output part 410 in the second operation mode. The first switching parts 430-1 to 430-5 respectively receive the first switching control signals SW-1 to SW-5 in the first operation mode and respectively receive the second switching control signals SW-10 to SW-50 in the second operation mode.

In the first operation mode, the first switching parts 430-1 to 430-5 apply the first scan signal TS1 to the first touch sensors TL1 to TL5 in response to the first switching control signals SW-1 to SW-5. In the second mode, the first switching parts 430-1 to 430-5 apply the second scan signal TS2 to the first touch sensors TL1 to TL5 in response to the second switching control signals SW-10 to SW-50.

The first scan signals TS1-1 to TS1-5 (refer to FIG. 10) of the first switch parts 430-1 to 430-5 are output in different periods from those of the second scan signals TS2-1 to TS2-5 (refer to FIG. 11) of the first switch parts 430-1 to 430-5. The first scan signals TS1-1 to TS1-5 and the second scan signals TS2-1 to TS2-5 may be sequentially output from the first switch parts 430-1 to 430-5 in the corresponding operation mode period.

Referring to FIG. 14, each of the first switch parts 430-1 to 430-5 may be a CMOS transistor. Hereinafter, the first switch part 430-1 will be described in detail as a representative example.

The CMOS transistor includes an n-type transistor and a p-type transistor. Control electrodes of the n-type transistor and the p-type transistor are commonly connected to each other to receive the first switching control signal SW-1 and the second switching control signal SW-10. In the present exemplary embodiment, the first switching control signal SW-1 has a high level in the turn-on period and the second switching control signal SW-10 has a low level in the turn-on period.

An input electrode of the n-type transistor receives the first scan signal TS1 and an input electrode of the p-type transistor receives the second scan signal TS2. An output electrode of the n-type transistor and an output electrode of the p-type transistor are commonly connected to the first touch sensor TLS1.

Figure 15:
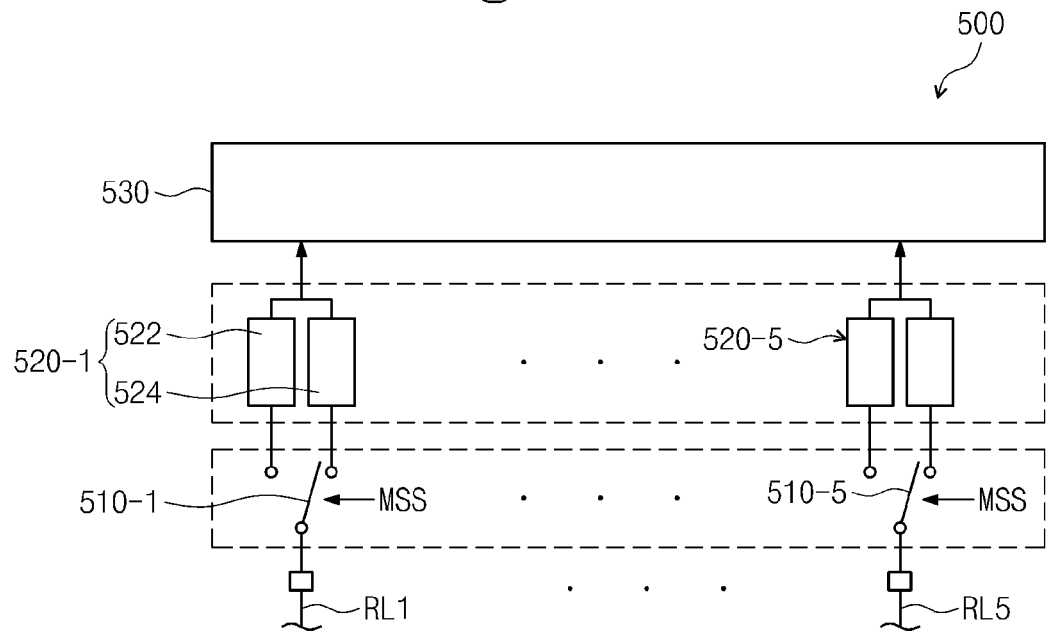
FIG. 15 is a block diagram showing an input sensor part shown in FIG. 2.
Figure 16:
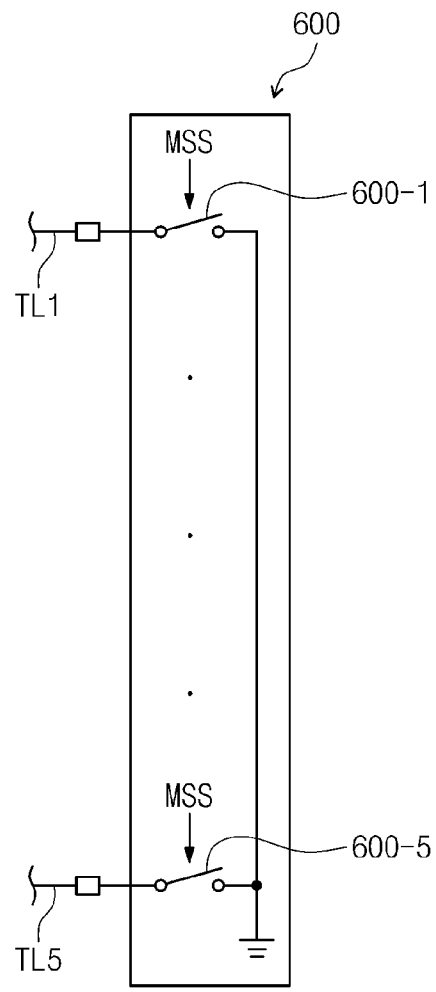
FIG. 16 is a block diagram showing a first switch part shown in FIG. 16.
Figure 17:
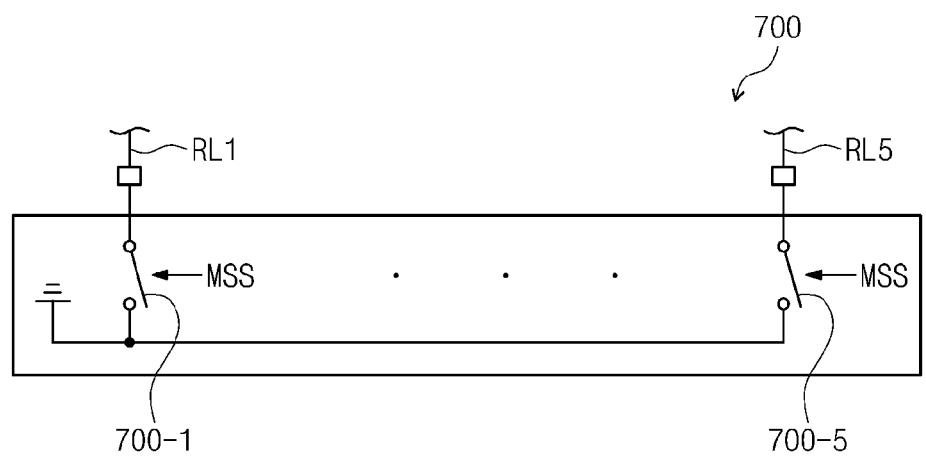
FIG. 17 is a block diagram showing a second switch part shown in FIG. 16.

FIG. 15 is a block diagram showing an input sensor part shown in FIG. 2, FIG. 16 is a block diagram showing a first switch part shown in FIG. 2, and FIG. 17 is a block diagram showing a second switch part shown in FIG. 2.

Referring to FIG. 15, the input sensor part 500 includes switches 510-1 to 510-5, signal processors 520-1 to 520-5, and a coordinate calculator 630. The switches 510-1 to 510-5 (hereinafter, referred to as second switches) are respectively connected to the second touch sensors RL1 to RL5. Each of the signal processors 520-1 to 520-5 includes a first signal processor 522 and a second signal processor 524.

The second switches 510-1 to 510-5 receive the mode selection signal MSS. Responsive to the mode selection signal MSS, the second switches 510-1 to 510-5 apply the first sensing signals SS1-1 to SS1-5 (refer to FIG. 10) to the first signal processors 522 and apply the second sensing signals SS2-1 to SS2-5 (refer to FIG. 11) to the second signal processors 524.

Each of the first signal processors 522 may include an amplifier, a noise filter, and an analog-to-digital converter.

The amplifier amplifies a corresponding first sensing signal of the first sensing signals SS1-1 to SS1-5. The noise filter removes noises from the amplified first sensing signal. The analog-to-digital converter converts the first sensing signals from which the noises are removed to first digital signals. The coordinate calculator 530 calculates the coordinate information of the first input position PP1 (refer to FIG. 10) from the first digital signals.

Each of the second signal processors 524 may include an amplifier, a band-pass filter, a wave detector, a sample-hold circuit, and an analog-to-digital converter, which are connected one after another to each other. The second sensing signals are converted to second digital signals. The coordinate calculator 530 calculates the coordinate information of the second input position PP2 (refer to FIG. 11) from the second digital signals.

Referring to FIG. 16, the first switch part 600 includes switches 600-1 to 600-5 (hereinafter, referred to as third switches). The third switches 600-1 to 600-5 receive the mode selection signal MSS. The third switches 600-1 to 600-5 are opened in the first operation mode and closed in the second operation mode. Thus, the third switches 600-1 to 600-5 may be used to float the second ends of the first touch sensors TL1 to TL5 in the first operation mode and ground the second ends of the first touch sensors TL1 to TL5 in the second operation mode.

Referring to FIG. 17, the second switch part 700 includes switches 700-1 to 700-5 (hereinafter, referred to as fourth switches). The fourth switches 700-1 to 700-5 receive the mode selection signal MSS. The fourth switches 700-1 to 700-5 are opened in the first operation mode and closed in the second operation mode. Thus, the fourth switches 700-1 to 700-5 may be used to float the second ends of the second touch sensors RL1 to RL5 in the first operation mode and ground the second ends of the second touch sensors RL1 to RL5 in the second operation mode.

FIGS. 18A to 18F are cross-sectional views showing a display panel according to exemplary embodiments of the present disclosure. In FIGS. 18A to 18F, the same reference numerals denote the same elements in FIGS. 3 and 4, and thus detailed descriptions of the same elements will be omitted. FIGS. 18A to 18F show cross-sectional views corresponding to that shown in FIG. 4, and the liquid crystal layer and the first substrate are not shown in FIGS. 18A to 18F.

As shown in FIGS. 18A to 18F, the first touch sensors TL and the second touch sensors RL may be arranged in various ways. For instance, the first touch sensors TL may be disposed on a layer different from the second touch sensors RL, or the first touch sensors TL and the second touch sensors RL may be disposed under the second base substrate SUB2.

Figure 18A:
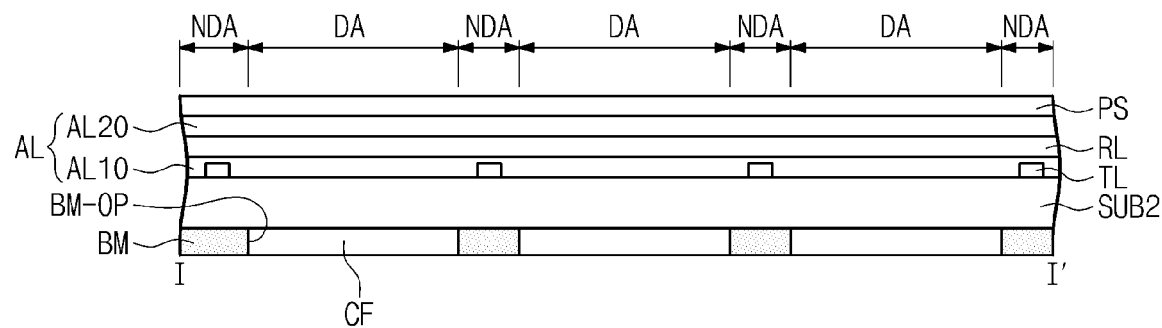
FIGS. 18A, 18B, 18C, 18D, 18E, and 18F are cross-sectional views showing a display panel according to an exemplary embodiment of the present disclosure.

Referring to FIG. 18A, the black matrix BM and the color filters CF are disposed on the lower surface of the second base substrate SUB2. The first touch sensors TL are disposed on the upper surface of the second base substrate SUB2. The third insulating layer AL10 is disposed on the upper surface of the second base substrate SUB2 to cover the first touch sensors TL. The second touch sensors RL are disposed on the third insulating layer AL10. The fourth insulating layer AL20 is disposed on the third insulating layer AL10 to cover the second touch sensors RL, and the protective layer PS is disposed on the fourth insulating layer AL20.

As described above, the first touch sensors TL are disposed on the layer different from that on which the second touch sensors RL are disposed, and thus the bridge electrodes CNE1 and CNE2 (refer to FIG. 8) may be omitted. Accordingly, the manufacturing process of the display panel is simplified and the defect in contact of the first touch sensors TL or the second touch sensors RL is reduced.

Figure 18B:
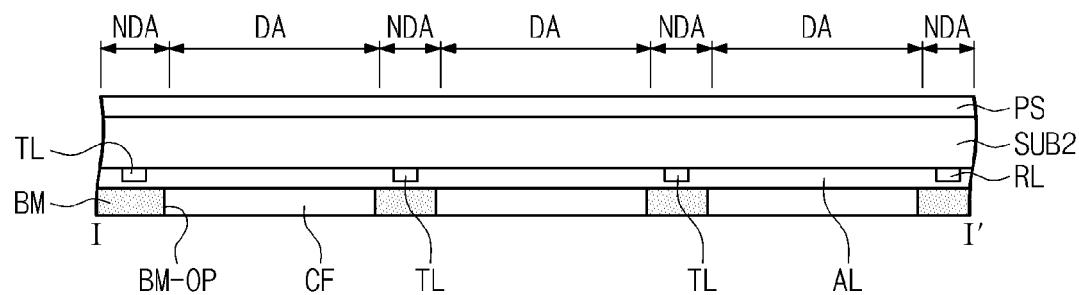

Referring to FIG. 18B, the first touch sensors TL and the second touch sensors RL are disposed on the lower surface of the second base substrate SUB2. The insulating layer AL is disposed on the lower surface of the second base substrate SUB2 to cover the first touch sensors TL and the second touch sensors RL. The black matrix BM and the color filters CF are disposed on the insulating layer AL.

The first touch sensors TL and the second touch sensors RL are disposed on the same layer. Either the first touch sensors TL or the second touch sensors RL include the bridge electrodes CNE1 and CNE2 (refer to FIG. 8). The bridge electrodes CNE1 and CNE2 connect the cut-out touch sensors among the first touch sensors TL and the second touch sensors RL through the contact holes formed through the insulating layer AL. The manufacturing method of the first touch sensors TL and the second touch sensors RL may be the same as that described with reference to FIG. 9 except for a deposition order.

Figure 18C:
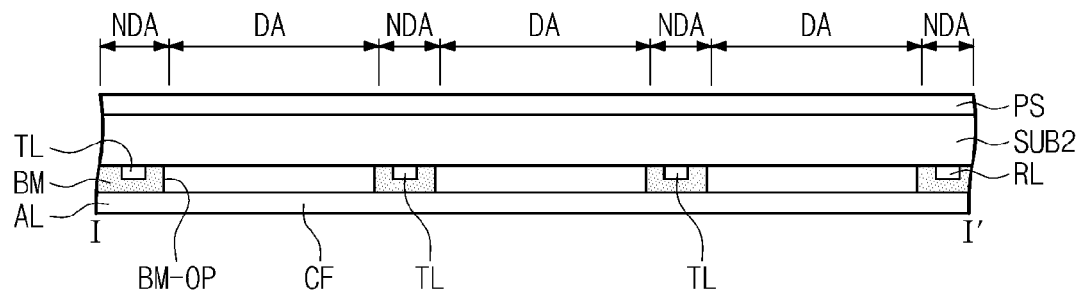

Referring to FIG. 18C, the first touch sensors TL and the second touch sensors RL are disposed on the lower surface of the second base substrate SUB2. The black matrix BM is disposed on the lower surface of the second base substrate SUB2 to cover the first touch sensors TL and the second touch sensors RL. The insulating layer AL is disposed on the black matrix BM and the color filters CF to planarize the upper surface of the black matrix BM and the color filters CF.

The first touch sensors TL and the second touch sensors RL are disposed on the same layer. Either the first touch sensors TL or the second touch sensors RL include the bridge electrodes CNE1 and CNE2 (refer to FIG. 8).

The bridge electrodes CNE1 and CNE2 connect the cut-out touch sensors among the first touch sensors TL and the second touch sensors RL through the contact holes formed through the black matrix BM. The manufacturing method of the first touch sensors TL and the second touch sensors RL may be similar to that described with reference to FIG. 9 except for a deposition order.

Figure 18D:
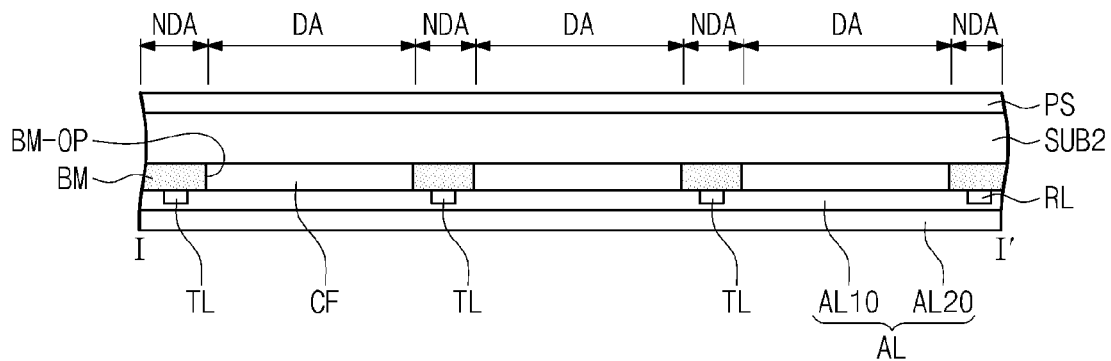

Referring to FIG. 18D, the black matrix BM and the color filters CF are disposed on the lower surface of the second base substrate SUB2.

The first touch sensors TL and the second touch sensors RL are disposed on the lower surface of the black matrix BM. The insulating layer AL is disposed on the black matrix BM and the color filters CF to cover the first touch sensors TL and the second touch sensors RL.

The first touch sensors TL and the second touch sensors RL are disposed on the same layer. Either the first touch sensors TL or the second touch sensors RL include the bridge electrodes CNE1 and CNE2 (refer to FIG. 8).

Figure 18E:
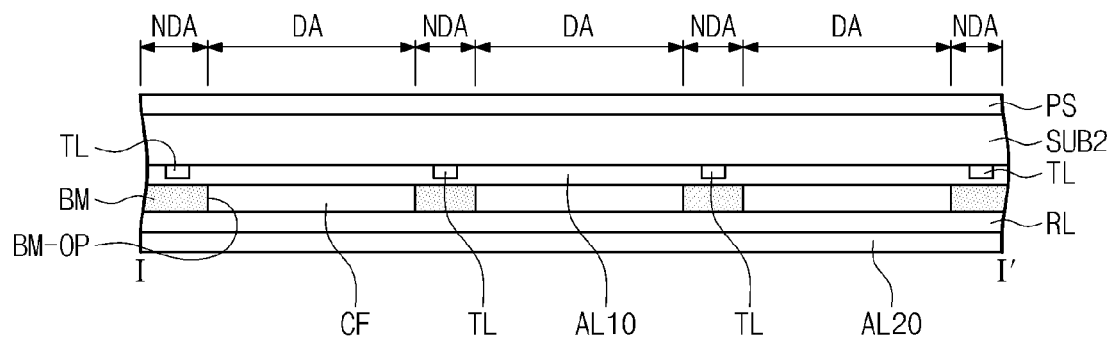

Referring to FIG. 18E, the first touch sensors TL are disposed on the lower surface of the second base substrate SUB2.

The third insulating layer AL10 is disposed on the lower surface of the second base substrate SUB2 to cover the first touch sensors TL. The black matrix BM and the color filters CF are disposed on the third insulating layer AL10. The second touch sensors RL are disposed on the lower surface of the black matrix BM. The fourth insulating layer AL20 is disposed on the black matrix BM and the color filters CF to cover the second touch sensors RL.

Figure 18F:
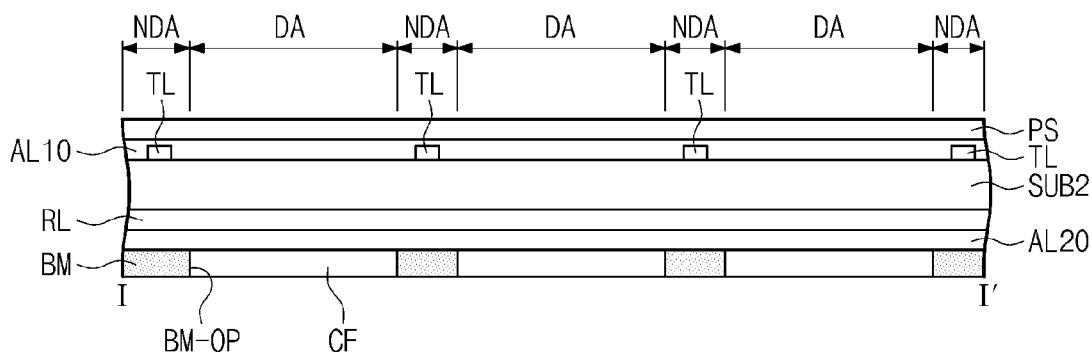

Referring to FIG. 18F, the first touch sensors TL are disposed on the upper surface of the second base substrate SUB2, and the second touch sensors RL are disposed on the lower surface of the second base substrate SUB2. The third insulating layer AL10 is disposed on the upper surface of the second base substrate SUB2 to cover the first touch sensors TL. The fourth insulating layer AL20 is disposed on the lower surface of the second base substrate SUB2 to cover the second touch sensors RL. The black matrix BM and the color filters CF are disposed on the fourth insulating layer AL20.

Figure 19A:
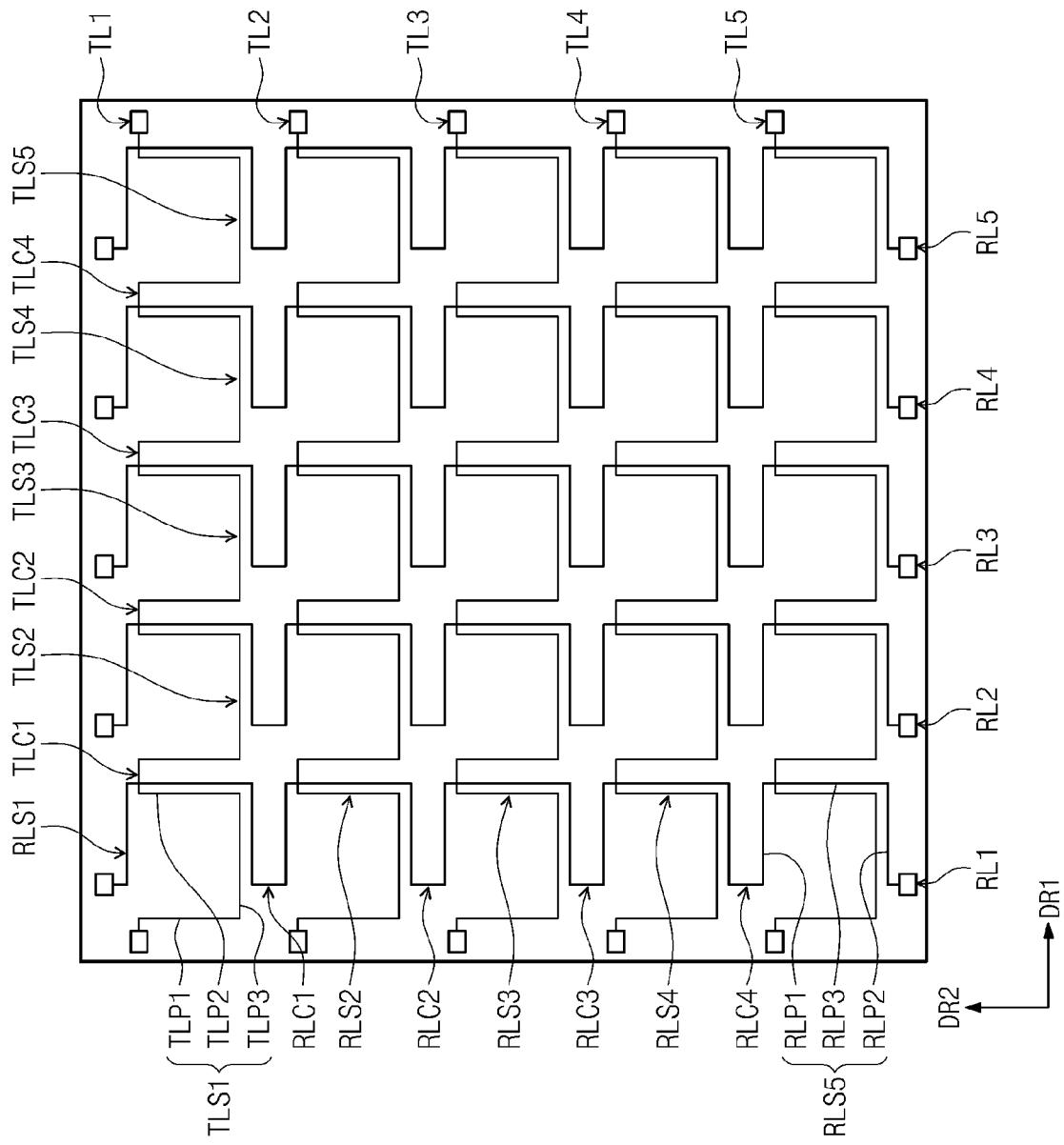
FIGS. 19A, 19B, and 19C are plan views showing first touch sensors and second touch sensors according to an exemplary embodiment of the present disclosure.
Figure 19B:
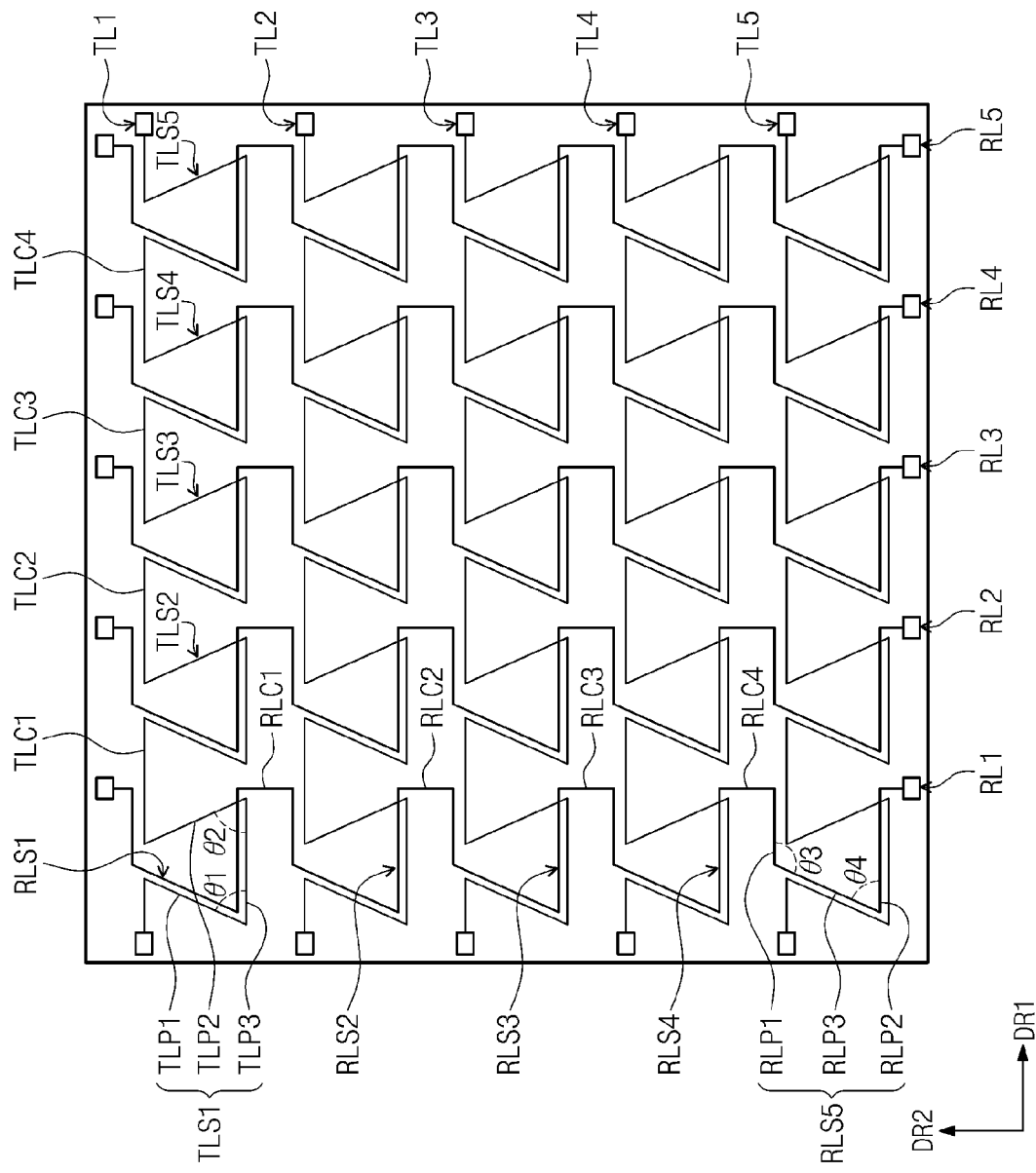
Figure 19C:
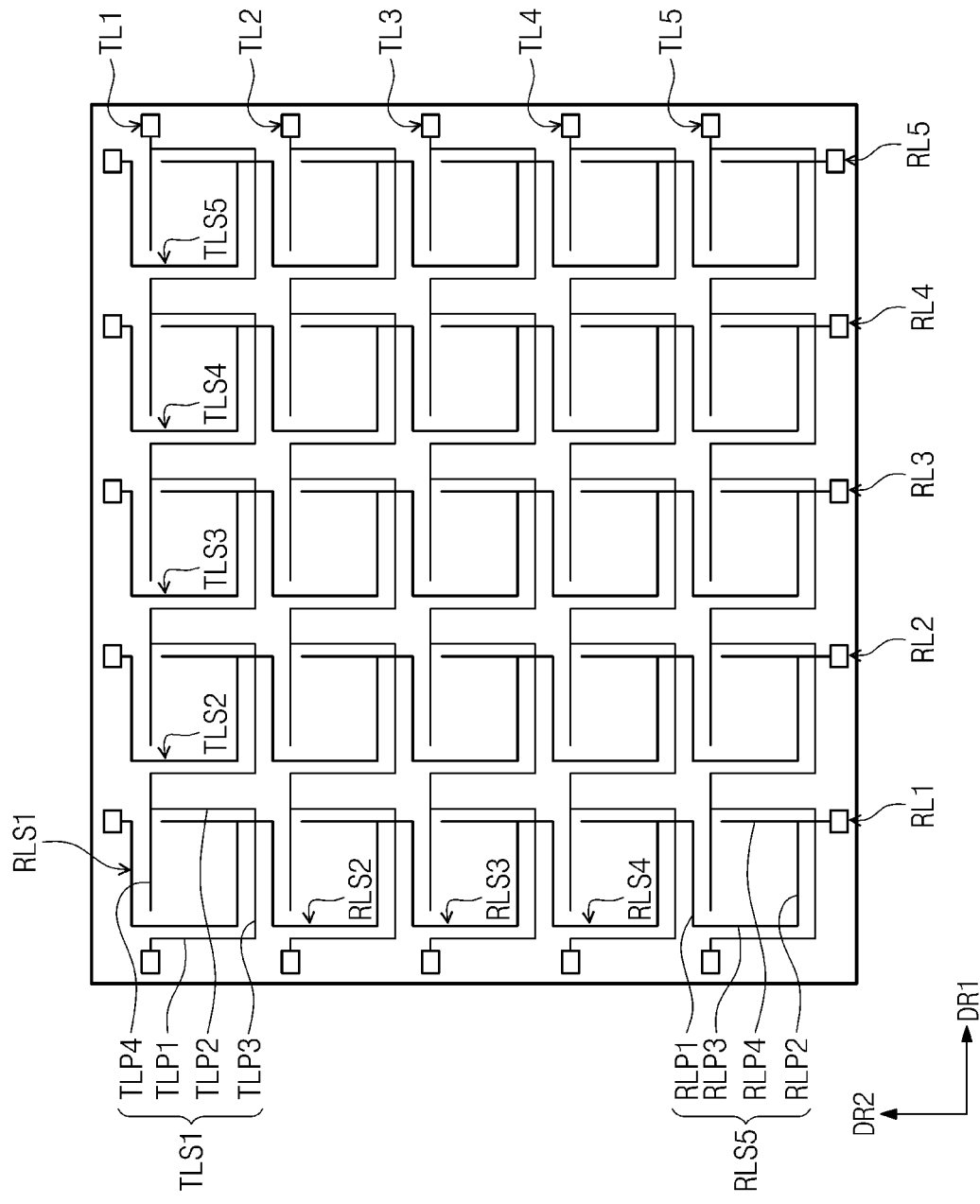

FIGS. 19A to 19C are plan views showing the first touch sensors and the second touch sensors according to exemplary embodiments of the present disclosure. In FIGS. 19A to 19C, the same reference numerals denote the same elements in FIGS. 5 to 9, and thus detailed descriptions of the same elements will be omitted.

Referring to FIG. 19A, each of the first touch sensors TL1 to TL5 includes first sensor portions TLS1 to TLS5 and first connection portions TLC1 to TLC4 to connect the first sensor portions TLS1 to TLS5.

Each of the second touch sensors RL1 to RL5 includes second sensor portions RLS1 to RLS5 and second connection portions RLC1 to RLC4 to connect the second sensor portions RLS1 to RLS5. The second touch sensors RL1 to RL5 shown in FIG. 19A are the same as the shape obtained by rotating the second touch sensors RL1 to RL5 shown in FIG. 5 by about 180 degrees. Each of the second sensor portions RLS1 to RLS5 has a loop shape partially opened and includes a first portions RLP1, a second portion RLP2, and a third portion RLP3.

The first connection portions TLC1 to TLC4 of the first touch sensors TL1 to TL5 cross the third portions RLP3 of the second touch sensors RL1 to RL5. The first connection portions TLC1 to TLC4 or the third portions RLP3 of the second touch sensors RL1 to RL5 include bridge electrodes CNE1 and CNE2 (refer to FIG. 8).

Referring to FIG. 19B, the first portion TLP1 and the third portion TLP3 of the first sensor portions TLS1 to TLS5 form an acute angle θ1, and the second portion TLP2 and the third portion TLP3 of the first sensor portions TLS1 to TLS5 form an acute angle θ2. Each of the first sensor portions TLS1 to TLS5 has a triangular shape in which an apex is opened. Therefore, the magnetic field may be more easily induced in the first sensor portions TLS1 to TLS5.

The first portion RLP1 and the third portion RLP3 of the second sensor portions RLS1 to RLS5 form an obtuse angle θ3, and the second portion RLP2 and the third portion RLP3 of the second sensor portions RLS1 to RLS5 form an acute angle θ4. The third portions RLP3 of the second sensor portions RLS1 to RLS5 are adjacent to and face the first portions TLP1 of the first sensor portions TLS1 to TLS5. In addition, the second portions RLP2 of the second sensor portions RLS1 to RLS5 are adjacent to and face the third portions TLP3 of the first sensor portions TLS1 to TLS5.

The second portions TLP2 of the first touch sensors TL1 to TL5 cross the second portions RLP2 of the second touch sensors RL1 to RL5. The second portions TLP2 of the first touch sensors TL1 to TL5 or the second portions RLP2 of the second touch sensors RL1 to RL5 include bridge electrodes CNE1 and CNE2 (refer to FIG. 8).

Referring to FIG. 19C, each of the first sensor portions TLS1 to TLS5 further includes a fourth portion TLP4 connected to the second portion TLP2 and facing the third portion TLP3. The fourth portion TLP4 is not connected to the first portion TLP1. Each of the second sensor portions RLS1 to RLS5 further includes a fourth portion RLP4 corresponding to the fourth portion TLP4 of the first sensor portions TLS1 to TLS5. Each of the first sensor portions TLS1 to TLS5 and each of the second sensor portions RLS1 to RLS5 have a rectangular shape in which a portion thereof is opened.

The second portions TLP2 of the first sensor portions TLS1 to TLS5 are adjacent to and face the fourth portions RLP4 of the second sensor portions RLS1 to RLS5 to form capacitors. In addition, the fourth portions TLP4 of the first sensor portions TLS1 to TLS5 are adjacent to and face the first portions RLP1 of the second sensor portions RLS1 to RLS5 to form capacitors. These capacitors increase the capacitance variation, and thus a touch sensitivity in the first operation mode may be improved.

Since the first sensor portions TLS1 to TLS5 have the shape similar to a closed-loop shape, the magnetic field may be more easily induced in the first sensor portions TLS1 to TLS5 in the second operation mode. In addition, a frequency receiving sensitivity of the second sensor portions RLS1 to RLS5, which have the shape similar to a closed-loop shape, may be improved.

Figure 20:
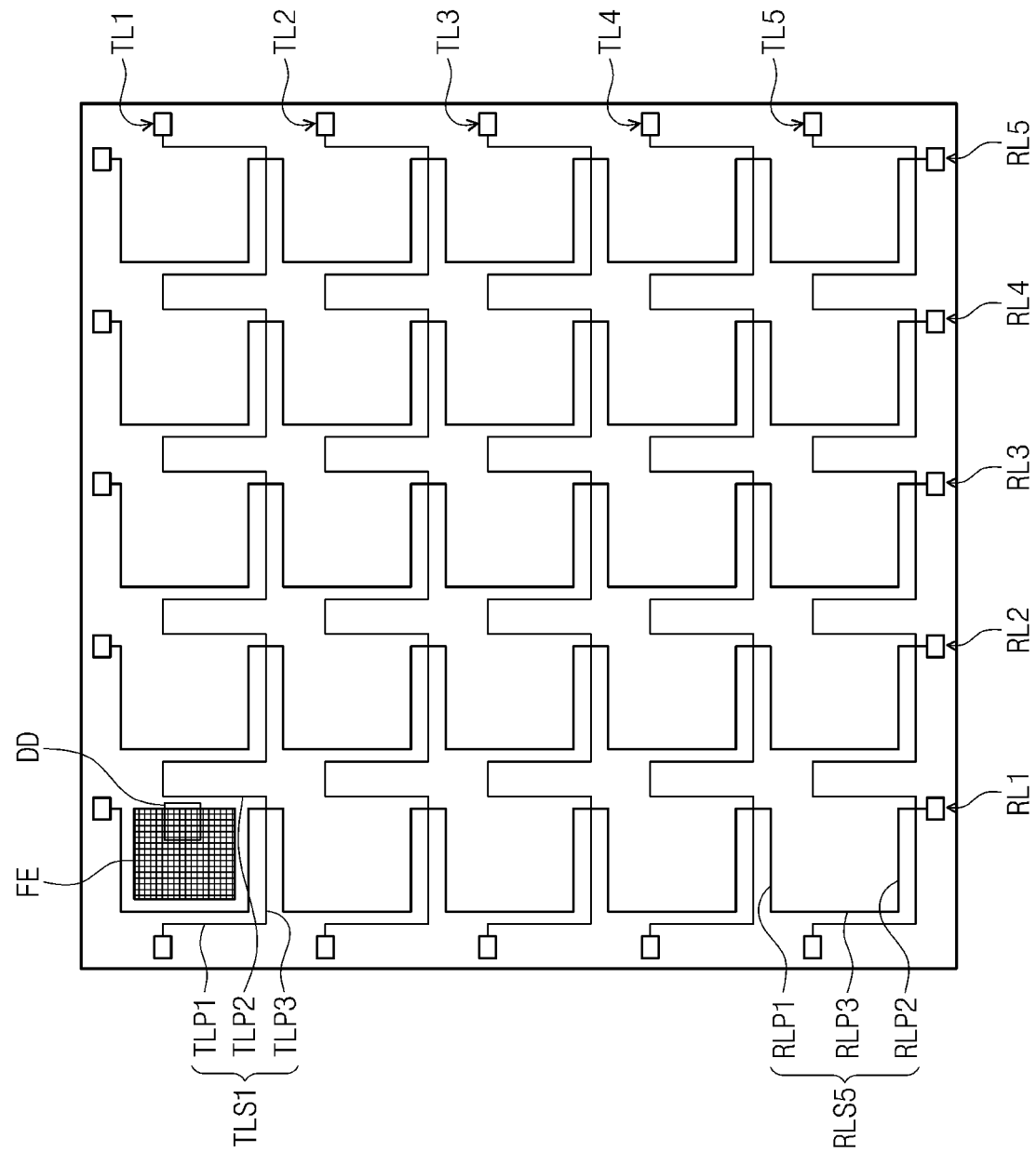
FIG. 20 is a plan view showing first touch sensors and second touch sensors according to an exemplary embodiment of the present disclosure.
Figure 21:
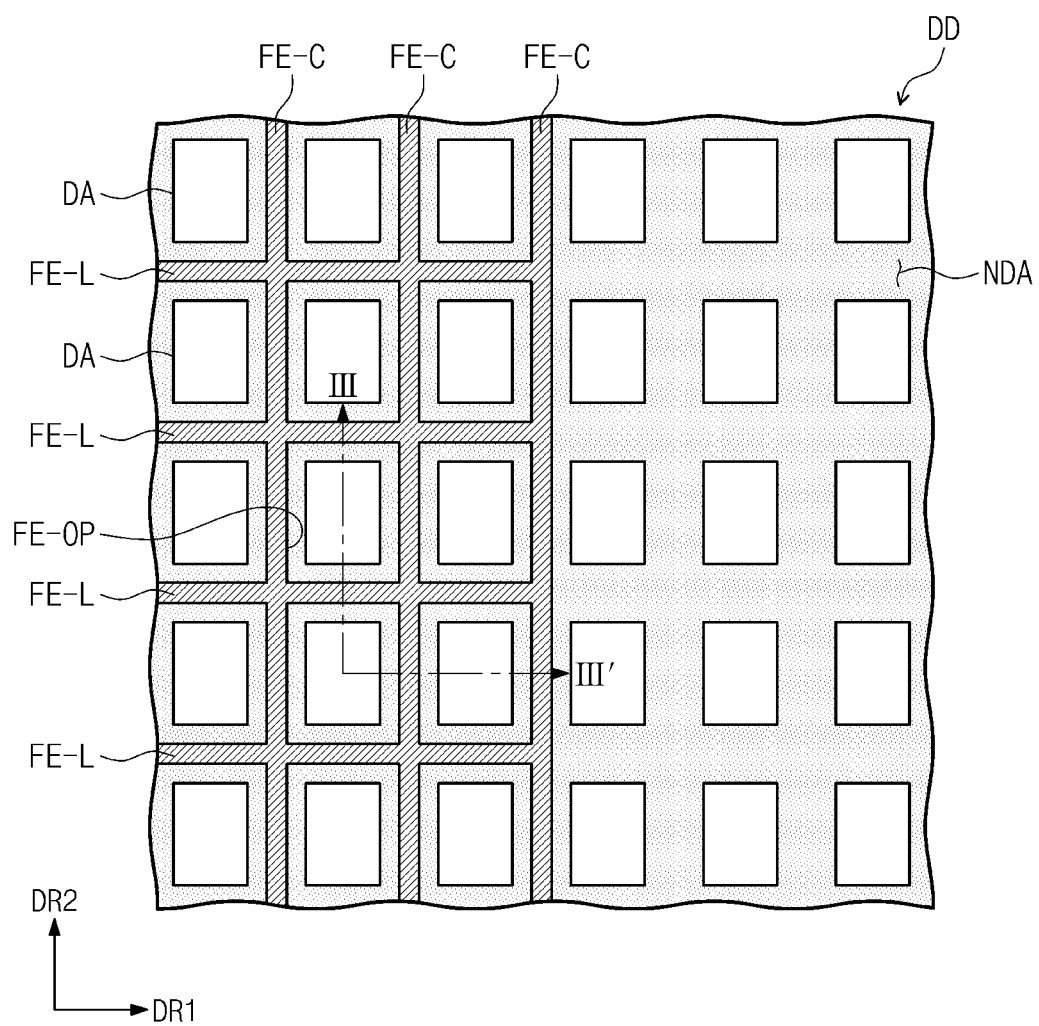
FIG. 21 is an enlarged plan view showing a portion DD of FIG. 20.
Figure 22:
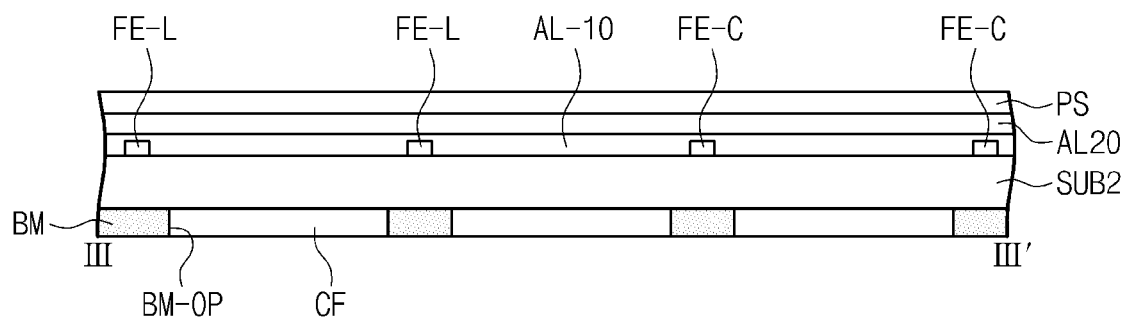
FIGS. 22 and 23 are cross-sectional views taken along a line III-III' of FIG. 21.

FIG. 20 is a plan view showing first touch sensors and second touch sensors according to an exemplary embodiment of the present disclosure, FIG. 21 is an enlarged plan view showing a portion DD of FIG. 20, and FIG. 22 is a cross-sectional view taken along a line III-III' of FIG. 21. FIG. 20 shows the first touch sensors TL1 to TL5 and the second touch sensors RL1 to RL5 shown in FIG. 5, but the first touch sensors TL1 to TL5 and the second touch sensors RL1 to RL5 may be replaced with the first touch sensors TL1 to TL5 and the second touch sensors RL1 to RL5 shown in FIGS. 19A to 19C.

The display device according to the present exemplary embodiment further includes floating electrodes FE surrounded by the first sensor portions TLS1 to TLS5 of the first touch sensors TL1 to TL5 and the second sensor portions RLS1 to RLS5 of the second touch sensors RL1 to RL5. FIG. 20 shows one floating electrode FE as a representative example.

The floating electrodes FE form capacitors with the first touch sensors TL1 to TL5 and the second touch sensors RL1 to RL5. The capacitors increase the capacitance variation, and thus the touch sensitivity in the first operation mode may be improved. The floating electrodes FE do not exert influence on the magnetic field formed in the first touch sensors TL1 to TL5 in the second operation mode.

Referring to FIG. 21, the floating electrodes FE include a plurality of horizontal portions FE-L extended in the first direction DR1 and a plurality of vertical portions FE-C extended in the second direction DR2. The horizontal portions FE-L are connected to the vertical portions FE-C to form a plurality of openings FE-OP. The openings FE-OP are overlapped with the opening areas DA. Each of the floating electrodes FE has a mesh shape defined by the openings FE-OP.

Referring to FIG. 22, the horizontal portions FE-L and the vertical portions FE-C may be disposed on the upper surface of the second base substrate SUB2. The floating electrodes FE may include the same material as the first touch sensors TL1 to TL5 or the second touch sensors RL1 to RL5 and may be formed through the same process as the first touch sensors TL1 to TL5 or the second touch sensors RL1 to RL5.

Although not shown in figures, the floating electrodes FE may be disposed on the same layer as the first touch sensors TL1 to TL5 and/or the second touch sensors RL1 to RL5 shown in FIGS. 18A to 18F.

Figure 23:
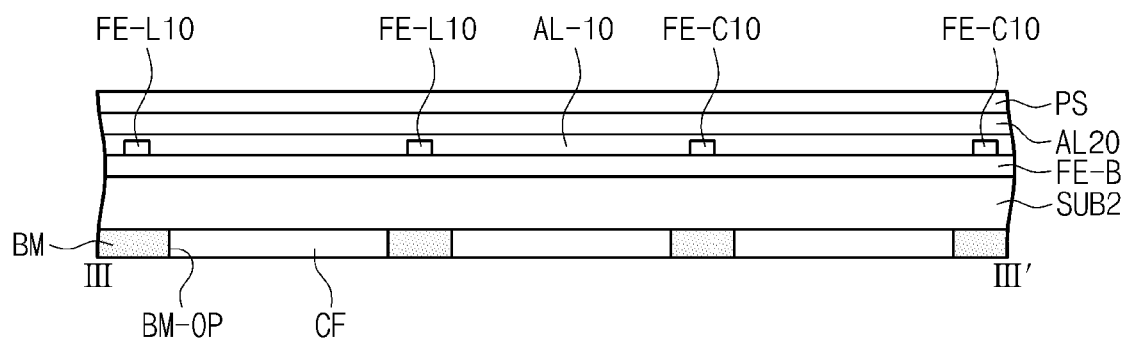

FIG. 23 is a cross-sectional view taken along a line III-III' of FIG. 21. In FIG. 23, the same reference numerals denote the same elements in FIGS. 20 to 22, and thus detailed descriptions of the same elements will be omitted.

Each of the floating electrodes FE may have a double-layer structure. As shown in FIG. 23, each of the floating electrodes FE includes a first layer FE-B formed of a transparent conductive material and a second layer FE-L10 and FE-C20 disposed on the first layer FE-B.

The first layer FE-B may include a transparent metal oxide material, e.g., indium tin oxide. Here, the first layer FE-B may be disposed in a rectangular or square shaped pattern upon which the entire floating electrode FE is disposed. The second layer FE-L10 and FE-C20 may include the same material as the first touch sensors TL1 to TL5 and/or the second touch sensors RL1 to RL5. The second layer FE-L10 and FE-C20 includes horizontal portions FE-L10 and vertical portions FE-C20. The horizontal portions FE-L10 and the vertical portions FE-C20 correspond to the horizontal portions FE-L and the vertical portions FE-C shown in FIGS. 21 and 22.

Although not shown in figures, the second layer FE-L10 and FE-C20 may be disposed on the same layer as the first touch sensors TL1 to TL5 and/or the second touch sensors RL1 to RL5 shown in FIGS. 18A and 18F. In this case, the first layer FE-B may arranged successive to the second layer FE-L10 and FE-C20.

Figure 24:
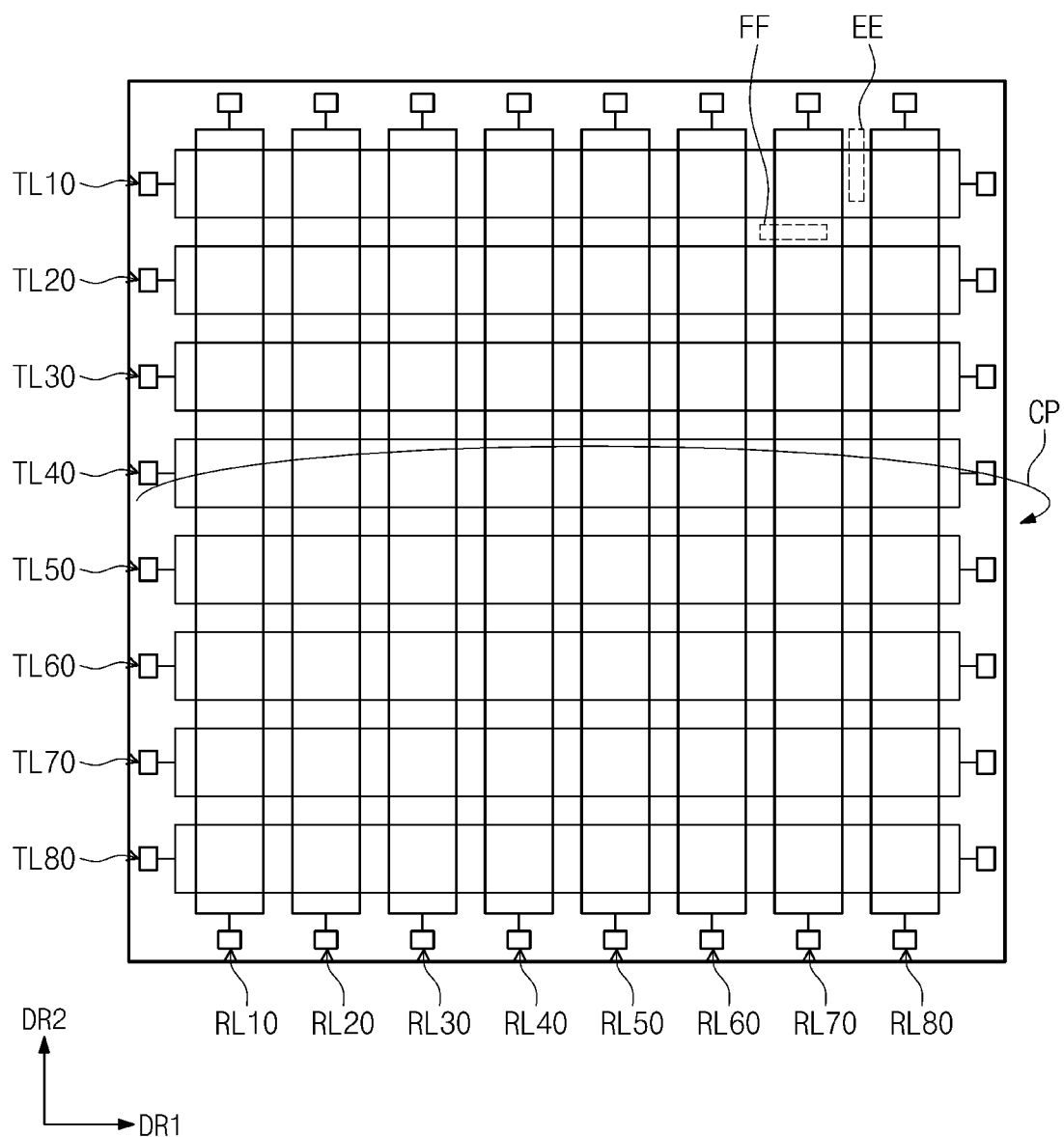
FIG. 24 is a plan view showing first touch sensors and second touch sensors according to an exemplary embodiment of the present disclosure.
Figure 25:
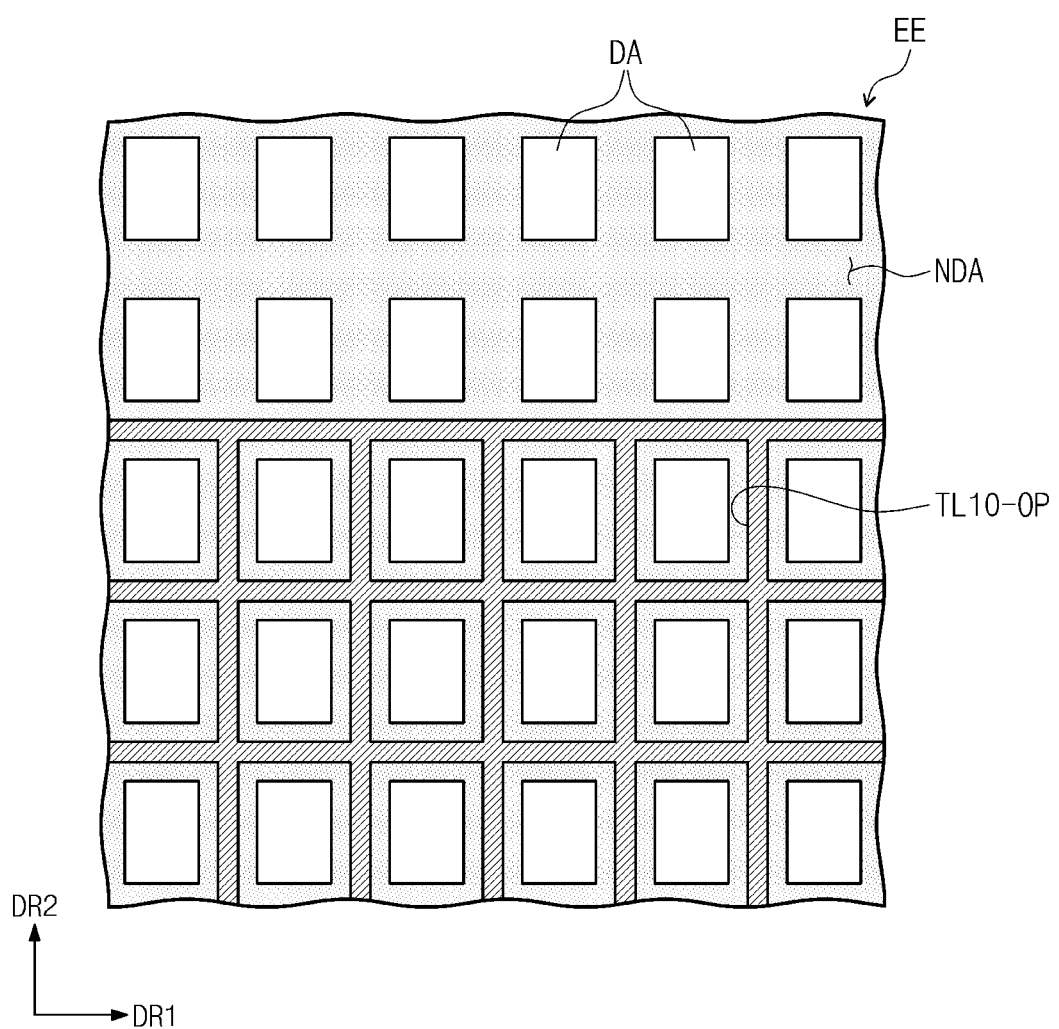
FIG. 25 is an enlarged plan view showing a portion EE of FIG. 24.
Figure 26:
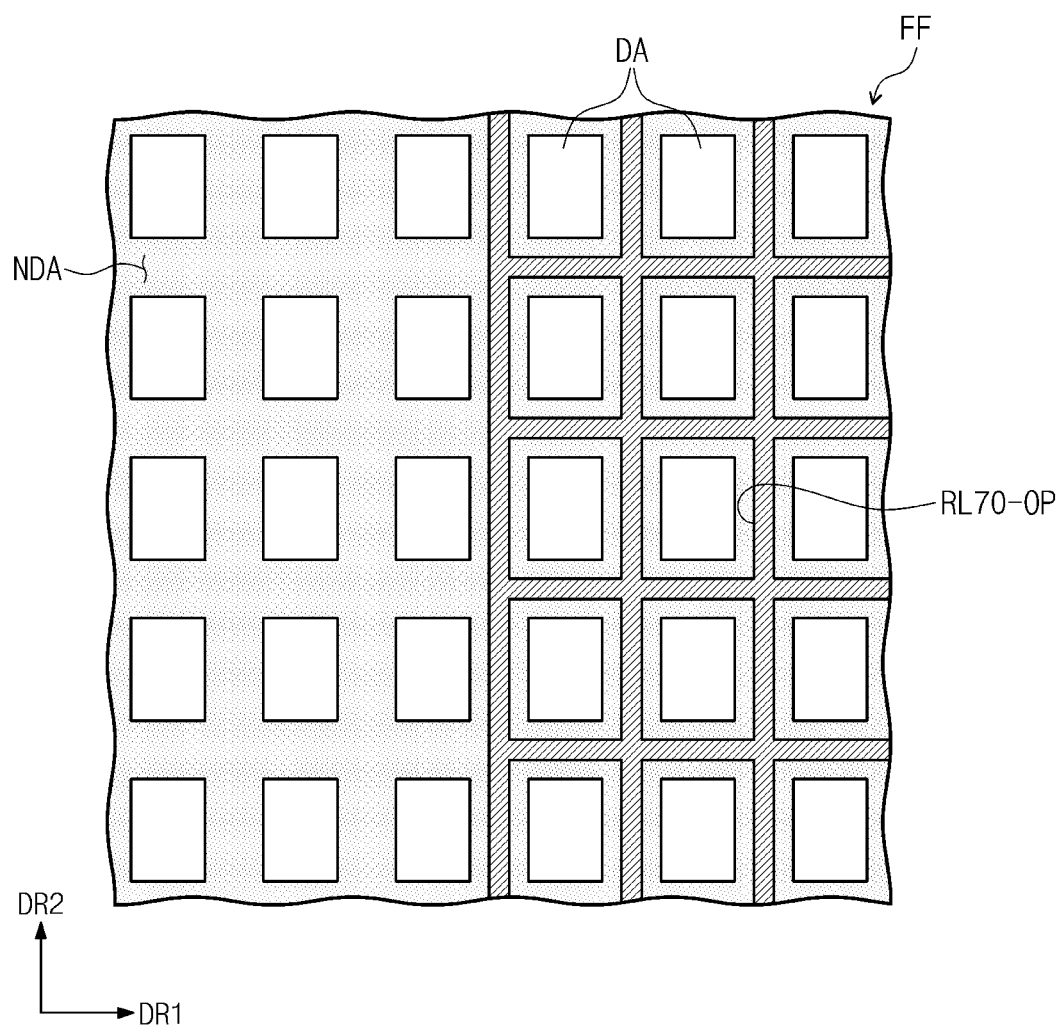
FIG. 26 is an enlarged plan view showing a portion FF of FIG. 24.

FIG. 24 is a plan view showing first touch sensors and second touch sensors according to an exemplary embodiment of the present disclosure. FIG. 25 is an enlarged plan view showing a portion EE of FIG. 24. FIG. 26 is an enlarged plan view showing a portion FF of FIG. 24. In FIG. 24, the same reference numerals denote the same elements in FIGS. 1 to 23, and thus detailed descriptions of the same elements will be omitted.

The first touch sensors TL10 to TL80 extend in the first direction DR1 and are arranged in the second direction DR2. The second touch sensors RL10 to RL80 extend in the second direction DR2 and arranged in the first direction DR1. Although FIG. 24 shows eight first touch sensors TL10 to TL80 and eight second touch sensors RL10 to RL80, the panel may include more or less of each of the first and second touch sensors.

Each of the first touch sensors TL10 to TL80 and each of the second touch sensors RL10 to RL80 may have a bar shape. The touch panel according to the present exemplary embodiment may be operated in the first operation mode and the second operation mode as described with reference to FIGS. 10 and 11.

The touch panel operated in the first operation mode calculates the coordinate information of the input position in the same way as the electrostatic capacitive type touch panel. The first touch sensors TL10 to TL80 correspond to input touch electrodes of the electrostatic capacitive type touch panel, and the second touch sensors RL10 to RL80, which are capacitive-coupled to the first touch sensors TL10 to TL80, correspond to output touch electrodes of the electrostatic capacitive type touch panel.

The touch panel operated in the second operation mode calculates the coordinate information of the input position in the same way as the electromagnetic induction type touch panel. The first touch sensors TL10 to TL80 correspond to input coils of the electromagnetic induction type touch panel, and the second touch sensors RL10 to RL80 correspond to output coils of the electromagnetic induction type touch panel.

In the second operation mode, first ends of the first touch sensors TL10 to TL80 receive the scan signals activated in different periods and second ends of the first touch sensors TL10 to TL80 receive the direct current voltage, e.g., the ground voltage. Although the first touch sensors TL10 to TL80 have the bar shape, each of the first touch sensors TL10 to TL80 forms a current loop CR by the corresponding scan signal of the scan signals and the direct current voltage. The magnetic field is induced adjacent to the first touch sensors TL10 to TL80 by the current loop CR.

When the input device (not shown) approaches to the first touch sensors TL10 to TL80, the magnetic field induced from the first touch sensors TL10 to TL80 resonates with the resonant circuit of the input device. Thus, the input device generates the resonant frequency.

The second touch sensors RL10 to RL80 receive the resonant frequency from the input device. The second ends of the second touch sensors RL10 to RL80 are applied with the direct current voltage, e.g., the ground voltage. The first ends of the second touch sensors RL10 to RL80 are applied with sensing signals according to the resonant frequency of the input device.

The first touch sensors TL10 to TL80 are disposed on a different layer from the second touch sensors RL10 to RL80 as described with reference to FIGS. 18A to 18E. The second base substrate SUB2 may be disposed between the first touch sensors TL10 to TL80 and the second touch sensors RL10 to RL80.

As shown in FIGS. 25 and 26, one or both of the first touch sensors TL10 to TL80 and the second touch sensors RL10 to RL80 may have a mesh shape. The first touch sensors TL10 to TL80 includes openings TL10-OP overlapped with corresponding opening areas of the opening areas DA. The second touch sensors RL10 to RL80 includes openings RL70-OP overlapped with corresponding opening areas of the opening areas DA. The first touch sensors TL10 to TL80 and the second touch sensors RL10 to RL80, which have the mesh shape, may have a metal material. In addition, the first touch sensors TL10 to TL80 and the second touch sensors RL10 to RL80 may include a transparent conductive material.

According to the above, the first and second touch sensors may be operated in an electrostatic capacitive scheme or an electromagnetic induction scheme according to the operation mode of the display device. Thus, the first and second touch sensors may sense external inputs in different ways.

In addition, since the first and second touch sensors are disposed on the same layer, the display device may be slimmed. Further, the first and second touch sensors may be overlapped with the black matrix, such that the first and second touch sensors are not perceived from external viewpoints.

Moreover, the display device may further include floating electrodes. In this case, touch sensitivity of the first and second touch sensors operated in the electrostatic capacitive scheme may be improved.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display device, comprising:
a first display substrate comprising a blocking area and opening areas;
a second display substrate facing the first display substrate;
first touch sensors disposed in the blocking area and configured to receive first scan signals in a first operation mode and to receive second scan signals in a second operation mode;
second touch sensors disposed in the blocking area, insulated from the first touch sensors, and crossing the first touch sensors, the second touch sensors being configured to output first sensing signals according to a variation in a capacitance in the first operation mode and to output second sensing signals according to a resonant frequency of an input device in the second operation mode;

a touch sensor driver configured to:
apply the first scan signals to first ends of the first touch sensors in the first operation mode; and
apply the second scan signals to the first ends of the first touch sensors in the second operation mode; and a first switch part configured to:
float second ends of the first touch sensors in the first operation mode; and
ground the second ends of the first touch sensors in the second operation mode, wherein each of the first touch sensors comprises:
first sensor portions configured to induce a magnetic field according to a corresponding second scan signal of the second scan signals and arranged in a first direction; and
first connection portions to connect the first sensor portions, and wherein each of the second touch sensors comprises:
second sensor portions configured to receive the resonant frequency of the input device and arranged in a second direction crossing the first direction; and
second connection portions to connect the second sensor portions.

2. The display device of claim 1, wherein the first display substrate comprises:
a first base substrate;
a black matrix disposed on the first base substrate and comprising first openings respectively corresponding to the opening areas;
color filters disposed in the first openings; and
at least one insulating layer disposed on the first base substrate.

3. The display device of claim 2, wherein the first touch sensors are disposed at a first side of the first base substrate, and the second touch sensors are disposed at a second side of the first base substrate.

4. The display device of claim 2, wherein the first and second touch sensors comprise chromium oxide, chromium nitride, titanium oxide, titanium nitride, or an alloy thereof.

5. The display device of claim 2, wherein the first and second touch sensors are disposed on the same side of the first base substrate.

6. The display device of claim 5, wherein the first touch sensors are disposed on a layer different from a layer on which the second touch sensors are disposed.

7. The display device of claim 5, wherein the first touch sensors and the second touch sensors are disposed on the same layer.

8. The display device of claim 7, wherein the first connection portions are disposed on the same layer as the first sensor portions, the at least one insulating layer covers the first sensor portions, the first connection portions, and the second sensor portions, and the second connection portions are connected to the second sensor portions through contact holes formed through the at least one insulating layer.

9. The display device of claim 8, wherein the second connection portions cross portions of the first sensor portions, and the at least one insulating layer is disposed between the second connection portions and the portions of the first sensor portions.

10. The display device of claim 7, wherein the first connection portions are disposed on the same layer as the first sensor portions, the black matrix covers the first sensor portions, the first connection portions, and the second sensor portions, and the second connection portions are connected to the second sensor portions through contact holes formed through the black matrix.

11. The display device of claim 10, wherein the second connection portions cross portions of the first sensor portions, and the black matrix is interposed between the second connection portions and the portions of the first sensor portions.

12. The display device of claim 2, wherein each of the first sensor portions comprises a first portion, a second portion facing the first portion, and a third portion connecting the first portion and the second portion.

13. The display device of claim 12, wherein each of the first, second, and third portions comprises a plurality of second openings overlapped with a portion of the first openings in a mesh shape.

14. The display device of claim 12, wherein each of the first sensor portions further comprises a fourth portion connected to the second portion and facing the third portion.

15. The display device of claim 12, further comprising floating electrodes, each of the floating electrodes being at least partially surrounded by the first, second, and third portions of each of the first sensor portions, respectively.

16. The display device of claim 15, wherein the floating electrodes comprise the same material as the first sensor portions.

17. The display device of claim 15, wherein each of the floating electrodes comprises:
a first layer comprising a transparent conductive material; and
a second layer disposed on the first layer to overlap with the black matrix and comprising second openings overlapped with a portion of the first openings.

18. The display device of claim 17, wherein the second layer comprises the same material as the first sensor portions.

19. The display device of claim 2, wherein the second display substrate comprises:
a second base substrate comprising pixel areas overlapped with the opening areas;
signal lines disposed on the second base substrate; and
pixels connected to a corresponding signal line of the signal lines and disposed in the pixel areas.

20. The display device of claim 19, further comprising a liquid crystal layer disposed between the first display substrate and the second display substrate.

21. The display device of claim 20, wherein each of the pixels comprises:
a common electrode configured to receive a common voltage; and
a pixel electrode configured to receive a pixel voltage from the corresponding signal line and to form a horizontal electric field in cooperation with the common electrode.

22. The display device of claim 1, further comprising:
an input sensor driver configured to receive the first sensing signals from first ends of the second touch sensors in the first operation mode and to receive the second scan signals from the first ends of the second touch sensors in the second operation mode to calculate coordinate information of input positions on the basis of the first sensing signals and the second sensing signals, and
a second switch part configured to float second ends of the second touch sensors in the first operation mode and to ground the second ends of the second touch sensors in the second operation mode.

23. The display device of claim 22, wherein the touch sensor driver comprises:
- a scan signal output part configured to output the first scan signals or the second scan signals in response to a mode selection signal;
- a selection part configured to output switching control signals turned-on in different periods; and
- switches, each switch being configured to receive a corresponding first scan signal of the first scan signals, a corresponding second scan signal of the second scan signals, and a corresponding switching control signal of the switching control signals and to apply the corresponding first scan signal or the corresponding second scan signal to a corresponding first touch sensor of the first touch sensors in response to the corresponding switching control signal.

24. The display device of claim 23, wherein each of the switches comprises an n-type transistor and a p-type transistor, a control electrode of the n-type transistor and a control electrode of the p-type transistor being configured to receive the corresponding switching control signal, and an output electrode of the n-type transistor and an output electrode of the p-type transistor being connected to the corresponding first touch sensor.

25. A display device, comprising: a first display substrate comprising a blocking area and opening areas; a second display substrate facing the first display substrate; first touch sensors extended in a first direction and arranged in a second direction substantially perpendicular to the first direction, the first touch sensors being configured to receive first scan signals in a first operation mode and to receive second scan signals in a second operation mode; and second touch sensors disposed in the blocking area, insulated from the first touch sensors, and crossing the first touch sensors, the second touch sensors being configured to output first sensing signals according to a variation in a capacitance in the first operation mode, and to output second sensing signals according to a resonant frequency of an input device in the second operation mode, wherein the first touch sensors and the second touch sensors are disposed in the blocking area and comprise openings correspondingly overlapping the opening areas; and wherein each of the first touch sensors and the second touch sensors forms a opened loop shape.

26. A method for operating a touch panel, the method comprising:
- receiving a mode selection signal, the mode selection signal indicating whether the touch panel operates in a first operating mode or a second operating mode;
- applying first scan signals to first ends of first touch sensors in the first operating mode;
- floating second ends of the first touch sensors and second ends of the second touch sensors in the first operating mode;
- applying second scan signals to the first ends of the first touch sensors in the second operating mode, the second scan signals being different from the first scan signals;
- grounding the second ends of the first touch sensors and the second ends of the second touch sensors in the second operating mode;
- receiving first sensing signals from first ends of second touch sensors in the first operating mode; and
- receiving second sensing signals from the first ends of the second touch sensors in the second operating mode.

27. The method of claim 26, wherein the first sensing signals correspond to a variation in capacitance detected using the first touch sensors and the second touch sensors, and the second sensing signals correspond to a resonant frequency of an input device detected using the first touch sensors and the second touch sensors.

28. The method of claim 26, further comprising:
- determining an image type to be displayed via the touch panel;
- setting the mode selection signal at a first level in response to determining a first image type is to be displayed via the touch panel, the first level corresponding to the first operating mode; and
- setting the mode selection signal at a second level in response to determining a second image type is to be displayed via the touch panel, the second level corresponding to the second operating mode.

29. The method of claim 28, wherein the first image type is a still image and the second image type is a moving image.

* * * * *